US011561144B1

(12) United States Patent
Han et al.

(10) Patent No.: US 11,561,144 B1
(45) Date of Patent: Jan. 24, 2023

(54) WEARABLE ELECTRONIC DEVICE WITH FLUID-BASED PRESSURE SENSING

(71) Applicant: Apple Inc., Cupertino, CA (US)

(72) Inventors: Caleb C. Han, Santa Clara, CA (US); Brad G. Boozer, Saratoga, CA (US); Mark G. Walsh, San Francisco, CA (US); William S. Lee, Fremont, CA (US); Tongbi T. Jiang, Santa Clara, CA (US); Jun Zhai, Cupertino, CA (US); Yun X. Ma, Cupertino, CA (US); James G. Horiuchi, Fresno, CA (US); David MacNeil, Cupertino, CA (US); Ashwin Balasubramanian, Sunnyvale, CA (US); Wei Chen, Palo Alto, CA (US); Jie-Hua Zhao, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 944 days.

(21) Appl. No.: 16/262,724

(22) Filed: Jan. 30, 2019

Related U.S. Application Data

(60) Provisional application No. 62/737,736, filed on Sep. 27, 2018.

(51) Int. Cl.
*G04G 21/02* (2010.01)
*G01L 7/08* (2006.01)
(Continued)

(52) U.S. Cl.
CPC ............... *G01L 7/082* (2013.01); *G01C 5/06* (2013.01); *G04B 47/066* (2013.01); *G04G 17/02* (2013.01); *G04G 21/02* (2013.01); *G04G 21/08* (2013.01)

(58) Field of Classification Search
CPC ........ G04G 21/02; G04G 17/02; G04G 21/08; G04B 47/066; G01C 5/06
See application file for complete search history.

(56) References Cited

U.S. PATENT DOCUMENTS

| 1,276,708 A | 8/1918 | Blair |
| 1,646,628 A | 10/1927 | Nolen |

(Continued)

FOREIGN PATENT DOCUMENTS

| CN | 2831113 | 10/2006 |
| CN | 204104134 | 1/2015 |

(Continued)

OTHER PUBLICATIONS

Translation for DE3009624A1—Apr. 6, 2022.*
Baechtle et al., "Adjustable Audio Indicator," IBM, 2 pages, Jul. 1, 1984.

(Continued)

*Primary Examiner* — Sean Kayes
(74) *Attorney, Agent, or Firm* — Brownstein Hyatt Farber Schreck, LLP

(57) ABSTRACT

An electronic device, such as a smart watch, incorporating a fluid-based pressure-sensing device is disclosed. The fluid-based pressure-sensing device includes an enclosure, a pressure sensor, a diaphragm and a sensing medium. The enclosure includes an opening and the pressure sensor is disposed inside the enclosure. The diaphragm hermetically seals the opening, and the sensing medium transfers a pressure exerted on the diaphragm to the pressure sensor. The sensing medium can be liquid oil filling a space of the enclosure, and the diaphragm is a polymer material. The pressure-sensing device may sense an environmental pressure, which may be used by the electronic device to modify its operations, change information that is displayed, and so on.

20 Claims, 14 Drawing Sheets

(51) Int. Cl.
  *G01C 5/06* (2006.01)
  *G04G 17/02* (2006.01)
  *G04B 47/06* (2006.01)
  *G04G 21/08* (2010.01)

(56) References Cited

U.S. PATENT DOCUMENTS

| | | | |
|---|---|---|---|
| 1,893,291 | A | 1/1933 | Kwartin |
| 1,992,605 | A | 2/1935 | Clifford et al. |
| 2,325,688 | A | 7/1943 | Landis |
| 2,779,095 | A | 1/1957 | Hottenroth, Jr. |
| 3,414,689 | A | 12/1968 | Gummel et al. |
| 3,866,299 | A | 2/1975 | Gregg et al. |
| 4,068,103 | A | 1/1978 | King et al. |
| 4,081,631 | A | 3/1978 | Feder |
| 4,089,576 | A | 5/1978 | Barchet |
| 4,095,411 | A | 6/1978 | Kondo |
| 4,132,437 | A | 1/1979 | Green |
| 4,245,642 | A | 1/1981 | Skubitz et al. |
| 4,352,168 | A * | 9/1982 | Anderson ............ B63C 11/32 341/16 |
| 4,466,441 | A | 8/1984 | Skubitz et al. |
| 4,658,425 | A | 4/1987 | Julstrom |
| 5,106,318 | A | 4/1992 | Endo et al. |
| 5,293,002 | A | 3/1994 | Grenet et al. |
| 5,335,011 | A | 8/1994 | Addeo et al. |
| 5,341,433 | A | 8/1994 | Meyer et al. |
| 5,406,038 | A | 4/1995 | Reiff et al. |
| 5,521,886 | A | 5/1996 | Hirosawa et al. |
| 5,570,324 | A | 10/1996 | Geil |
| 5,604,329 | A | 2/1997 | Kressner et al. |
| 5,619,583 | A | 4/1997 | Page et al. |
| 5,733,153 | A | 3/1998 | Takahashi et al. |
| 5,879,598 | A | 3/1999 | McGrane |
| 5,958,203 | A | 9/1999 | Parce et al. |
| 5,960,366 | A | 9/1999 | Duwaer |
| 6,036,554 | A | 3/2000 | Koeda et al. |
| 6,073,033 | A | 6/2000 | Campo |
| 6,129,582 | A | 10/2000 | Wilhite et al. |
| 6,151,401 | A | 11/2000 | Annaratone |
| 6,154,551 | A | 11/2000 | Frenkel |
| 6,191,796 | B1 | 2/2001 | Tarr |
| 6,192,253 | B1 | 2/2001 | Charlier et al. |
| 6,317,237 | B1 | 11/2001 | Nakao et al. |
| 6,370,005 | B1 | 4/2002 | Sun et al. |
| 6,373,958 | B1 | 4/2002 | Enomoto et al. |
| 6,385,134 | B1 * | 5/2002 | Lange ................ G01L 19/16 368/11 |
| 6,400,825 | B1 | 6/2002 | Miyamoto et al. |
| 6,516,077 | B1 | 2/2003 | Yamaguchi et al. |
| 6,553,126 | B2 | 4/2003 | Han et al. |
| 6,700,987 | B2 | 3/2004 | Kuze et al. |
| 6,754,359 | B1 | 6/2004 | Svean et al. |
| 6,813,218 | B1 | 11/2004 | Antonelli et al. |
| 6,829,018 | B2 | 12/2004 | Lin et al. |
| 6,882,335 | B2 | 4/2005 | Saarinen |
| 6,892,850 | B2 | 5/2005 | Suzuki et al. |
| 6,924,792 | B1 | 8/2005 | Jessop |
| 6,934,394 | B1 | 8/2005 | Anderson |
| 6,942,771 | B1 | 9/2005 | Kayyem |
| 7,003,099 | B1 | 2/2006 | Zhang et al. |
| 7,059,932 | B1 | 6/2006 | Tobias et al. |
| 7,082,322 | B2 | 7/2006 | Harano |
| 7,116,795 | B2 | 10/2006 | Tuason et al. |
| 7,154,526 | B2 | 12/2006 | Foote et al. |
| 7,158,647 | B2 | 1/2007 | Azima et al. |
| 7,181,030 | B2 | 2/2007 | Rasmussen et al. |
| 7,263,373 | B2 | 8/2007 | Mattisson |
| 7,266,189 | B1 | 9/2007 | Day |
| 7,362,877 | B2 | 4/2008 | Honda et al. |
| 7,378,963 | B1 | 5/2008 | Begault et al. |
| 7,414,922 | B2 | 8/2008 | Ferri et al. |
| 7,527,523 | B2 | 5/2009 | Yohn et al. |
| 7,536,029 | B2 | 5/2009 | Choi et al. |
| 7,570,772 | B2 | 8/2009 | Sorensen et al. |
| 7,679,923 | B2 | 3/2010 | Inagaki et al. |
| 7,792,320 | B2 | 9/2010 | Proni |
| 7,867,001 | B2 | 1/2011 | Ambo et al. |
| 7,878,869 | B2 | 2/2011 | Murano et al. |
| 7,903,061 | B2 | 3/2011 | Zhang et al. |
| 7,912,242 | B2 | 3/2011 | Hikichi |
| 7,966,785 | B2 | 6/2011 | Zadesky et al. |
| 8,031,853 | B2 | 10/2011 | Bathurst et al. |
| 8,055,003 | B2 | 11/2011 | Mittleman et al. |
| 8,116,505 | B2 | 2/2012 | Kawasaki-Hedges et al. |
| 8,116,506 | B2 | 2/2012 | Kuroda et al. |
| 8,161,890 | B2 | 4/2012 | Wang |
| 8,204,266 | B2 | 6/2012 | Munoz et al. |
| 8,218,397 | B2 | 7/2012 | Chan |
| 8,226,446 | B2 | 7/2012 | Kondo et al. |
| 8,264,777 | B2 | 9/2012 | Skipor et al. |
| 8,286,319 | B2 | 10/2012 | Stolle et al. |
| 8,331,603 | B2 | 12/2012 | Martenson et al. |
| 8,340,312 | B2 | 12/2012 | Johnson et al. |
| 8,409,417 | B2 | 4/2013 | Wu |
| 8,417,298 | B2 | 4/2013 | Mittleman et al. |
| 8,447,054 | B2 | 5/2013 | Bharatan et al. |
| 8,452,037 | B2 | 5/2013 | Filson et al. |
| 8,488,817 | B2 | 7/2013 | Mittleman et al. |
| 8,508,908 | B2 | 8/2013 | Jewell-Larsen |
| 8,560,309 | B2 | 10/2013 | Pance et al. |
| 8,574,004 | B1 | 11/2013 | Tarchinski et al. |
| 8,620,162 | B2 | 12/2013 | Mittleman |
| 8,632,670 | B2 | 1/2014 | Garimella et al. |
| 8,644,519 | B2 | 2/2014 | Pance et al. |
| 8,644,533 | B2 | 2/2014 | Burns |
| 8,693,698 | B2 | 4/2014 | Carnes et al. |
| 8,724,841 | B2 | 5/2014 | Bright et al. |
| 8,804,993 | B2 | 8/2014 | Shukla et al. |
| 8,811,648 | B2 | 8/2014 | Pance et al. |
| 8,858,271 | B2 | 10/2014 | Yeung et al. |
| 8,879,761 | B2 | 11/2014 | Johnson et al. |
| 8,882,547 | B2 | 11/2014 | Asakuma et al. |
| 8,885,851 | B2 | 11/2014 | Westenbroek et al. |
| 8,983,097 | B2 | 3/2015 | Dehe et al. |
| 8,989,428 | B2 | 3/2015 | Kwong |
| 9,007,871 | B2 | 4/2015 | Armstrong-Muntner |
| 9,042,588 | B2 | 5/2015 | Aase |
| 9,066,172 | B2 | 6/2015 | Dix et al. |
| 9,161,434 | B2 | 10/2015 | Merz et al. |
| 9,182,859 | B2 | 11/2015 | Coulson et al. |
| 9,227,189 | B2 | 1/2016 | Sobek et al. |
| 9,229,494 | B2 | 1/2016 | Rayner |
| 9,357,299 | B2 | 5/2016 | Kwong |
| 9,380,369 | B2 | 6/2016 | Utterman et al. |
| 9,386,362 | B2 | 7/2016 | Filson et al. |
| 9,451,354 | B2 | 9/2016 | Zadesky et al. |
| 9,486,823 | B2 | 11/2016 | Andersen et al. |
| 9,497,527 | B2 | 11/2016 | Mittleman et al. |
| 9,774,941 | B2 | 9/2017 | Grinker |
| 9,820,033 | B2 | 11/2017 | Dix et al. |
| 9,838,811 | B2 | 12/2017 | Pelosi |
| 9,854,345 | B2 | 12/2017 | Briggs |
| 9,857,262 | B2 | 1/2018 | Kil et al. |
| 9,888,309 | B2 | 2/2018 | Prelogar et al. |
| 9,900,698 | B2 | 2/2018 | Luzzato et al. |
| 10,063,951 | B2 | 8/2018 | Filson et al. |
| 10,117,012 | B2 | 10/2018 | Saulsbury et al. |
| 10,455,311 | B2 | 10/2019 | Magariyachi et al. |
| 10,466,047 | B2 | 11/2019 | Ehman et al. |
| 10,466,961 | B2 | 11/2019 | Yang |
| 10,477,328 | B2 | 11/2019 | Han et al. |
| 10,757,491 | B1 | 8/2020 | Jackson et al. |
| 10,873,798 | B1 | 12/2020 | Jackson et al. |
| 2003/0087292 | A1 | 5/2003 | Chen et al. |
| 2004/0203520 | A1 | 10/2004 | Schirtzinger et al. |
| 2005/0009004 | A1 | 1/2005 | Xu et al. |
| 2005/0271216 | A1 | 12/2005 | Lashkari |
| 2006/0072248 | A1 | 4/2006 | Watanabe et al. |
| 2006/0233411 | A1 | 10/2006 | Utigard |
| 2007/0012827 | A1 | 1/2007 | Fu et al. |
| 2007/0191719 | A1 | 8/2007 | Yamashita et al. |
| 2008/0204379 | A1 | 8/2008 | Perez-Noguera |
| 2008/0260188 | A1 | 10/2008 | Kim |

(56) References Cited

U.S. PATENT DOCUMENTS

| | | |
|---|---|---|
| 2008/0292112 A1 | 11/2008 | Valenzuela et al. |
| 2008/0292126 A1 | 11/2008 | Sacha et al. |
| 2008/0310663 A1 | 12/2008 | Shirasaka et al. |
| 2009/0045005 A1 | 2/2009 | Byon et al. |
| 2011/0002487 A1 | 1/2011 | Panther et al. |
| 2011/0211724 A1 | 9/2011 | Hirata |
| 2012/0052924 A1 | 3/2012 | Cybart et al. |
| 2013/0141364 A1 | 6/2013 | Lynn et al. |
| 2013/0164999 A1 | 6/2013 | Ge et al. |
| 2013/0280965 A1 | 10/2013 | Kojyo |
| 2013/0322646 A1 | 12/2013 | Davie et al. |
| 2014/0022189 A1 | 1/2014 | Sheng et al. |
| 2014/0143784 A1* | 5/2014 | Mistry .................... G06F 3/017 718/102 |
| 2014/0250657 A1 | 9/2014 | Stanley et al. |
| 2015/0002452 A1 | 1/2015 | Klinghult et al. |
| 2015/0023510 A1 | 1/2015 | Shimizu |
| 2015/0078611 A1 | 3/2015 | Boozer et al. |
| 2016/0004311 A1 | 1/2016 | Yliaho et al. |
| 2016/0150311 A1 | 5/2016 | Bremyer et al. |
| 2016/0324478 A1 | 11/2016 | Goldstein |
| 2017/0035156 A1* | 2/2017 | Wright ................. A45C 13/008 |
| 2017/0094386 A1 | 3/2017 | Trainer et al. |
| 2017/0169673 A1 | 6/2017 | Billington et al. |
| 2017/0180850 A1 | 6/2017 | Hsu et al. |
| 2017/0347179 A1 | 11/2017 | Masaki et al. |
| 2019/0094973 A1 | 3/2019 | Miller et al. |
| 2020/0073338 A1 | 3/2020 | Liang et al. |
| 2020/0075272 A1 | 3/2020 | Solis et al. |
| 2020/0100013 A1 | 3/2020 | Harjee et al. |
| 2020/0107110 A1 | 4/2020 | Ji et al. |
| 2020/0344536 A1 | 10/2020 | Jackson et al. |

FOREIGN PATENT DOCUMENTS

| | | | |
|---|---|---|---|
| CN | 016415411 | | 2/2017 |
| CN | 107677538 | | 2/2018 |
| DE | 3009624 | * | 3/1980 |
| EP | 2094032 | | 8/2009 |
| GB | 2310559 | | 8/1997 |
| GB | 2342802 | | 4/2000 |
| JP | 2102905 | | 4/1990 |
| JP | 2003319490 | | 11/2003 |
| JP | 2004153018 | | 5/2004 |
| JP | 2006297828 | | 11/2006 |
| WO | WO03/049494 | | 6/2003 |
| WO | WO04/025938 | | 3/2004 |
| WO | WO2007/083894 | | 7/2007 |
| WO | WO08/153639 | | 12/2008 |
| WO | WO2009/017280 | | 2/2009 |
| WO | WO2011/057346 | | 5/2011 |
| WO | WO2011/061483 | | 5/2011 |
| WO | WO2016/190957 | | 12/2016 |
| WO | WO2018/135849 | | 7/2018 |

OTHER PUBLICATIONS

Blankenbach et al., "Bistable Electrowetting Displays," https://spie.org/x43687.xml, 3 pages, Jan. 3, 2011.

Enns, Neil, "Touchpad-Based Remote Control Devices," University of Toronto, 1998.

Pingali et al., "Audio-Visual Tracking for Natural Interactivity," Bell Laboratories, Lucent Technologies, pp. 373-382, Oct. 1999.

Valdes et al., "How Smart Watches Work," https://electronics.howstuffworks.com/gadgets/clocks-watches/smart-watch2.htm, 10 pages, Apr. 2005.

Zhou et al., "Electrostatic Graphene Loudspeaker," Applied Physics Letters, vol. 102, No. 223109, 5 pages, Dec. 6, 2012.

* cited by examiner

WEARABLE ELECTRONIC DEVICE WITH FLUID-BASED PRESSURE SENSING

CROSS-REFERENCE TO RELATED APPLICATION(S)

This application is a nonprovisional patent application of and claims the benefit of U.S. Provisional Patent Application No. 62/737,736, filed Sep. 27, 2018 and titled "Wearable Electronic Device with Fluid-Based Pressure Sensing," the disclosure of which is hereby incorporated herein by reference in its entirety.

FIELD

Embodiments described herein relate generally to electronic devices incorporating fluid-based pressure sensors, and more particularly to electronic watches employing oil-filled pressure sensors for measuring barometric pressure.

BACKGROUND

Portable communication devices (e.g., smart phones and smart watches) are becoming increasingly equipped with environmental sensors such as pressure, temperature and humidity sensors, gas sensors and particulate matter (PM) sensors. For example, a pressure sensor enables a smart watch or a smart phone to measure pressure and determine other parameters from that pressure measurement, including elevation, velocity, direction of motion, flow rate, and so on. Pressure sensors are used to measure pressure in a gas or liquid environment.

Pressure sensors can vary drastically in technology, design, performance and application. Various electronic devices employ a variety of pressure sensors, including piezoresistive, capacitive, electromagnetic, optical, or potentiometric pressure sensors. Some electronic devices use a gel-based pressure-sensing device, in which a pressure sensor is enclosed in a gel that is exposed to atmosphere. These pressure-sensing devices generally have poor chemical resistance and are susceptible to water and contaminant infiltration, all of which may degrade functionality and life of the pressure sensor.

SUMMARY

One embodiment described herein takes the form of an electronic watch, comprising: a housing defining a volume and a channel coupling the volume to an external environment; a display at least partially within the volume; a cover adjacent the display and coupled to the housing; a pressure-sensing device within the volume, configured to measure a pressure of the volume, and comprising: an enclosure; a diaphragm hermetically sealed to the enclosure; a sensing medium within the enclosure; and a pressure sensor encapsulated by the sensing medium; wherein the channel is configured to equalize the pressure of the volume and a pressure of the external environment; and the display is configured to display the pressure of the volume.

Another embodiment described herein takes the form of an electronic watch, comprising: a housing defining a volume and a channel coupling the volume to an external environment; a display at least partially within the volume and configured to display information; a substrate coupled to the housing; an oil-filled pressure-sensing device positioned within the volume and physically and electrically coupled to the substrate; a band coupled to the housing and configured to couple the housing to a wearer; and a processing unit electrically coupled to the oil-filled pressure-sensing device and the display; wherein: the processing unit is configured to control the display; the processing unit is configured to receive an output from the oil-filled pressure-sensing device; and the information displayed by the display changes based on the output.

Still another embodiment described herein takes the form of an electronic watch, comprising: a housing; a band coupled to the housing and configured to couple the housing to a wearer; a pressure-sensing device, comprising: an enclosure coupled to the housing; a diaphragm coupled to the enclosure; a pressure sensor within the enclosure; a sensing medium within the enclosure and configured to shield the pressure sensor from an environmental contaminant; a battery coupled to the pressure-sensing device; and a processing unit coupled to the pressure-sensing device; wherein: the pressure-sensing device is configured to measure a pressure of an external environment; the battery is configured to supply power to the pressure-sensing device and the processing unit; and the processing unit is configured to adjust an operation of the electronic watch based on the pressure of the external environment.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1A:
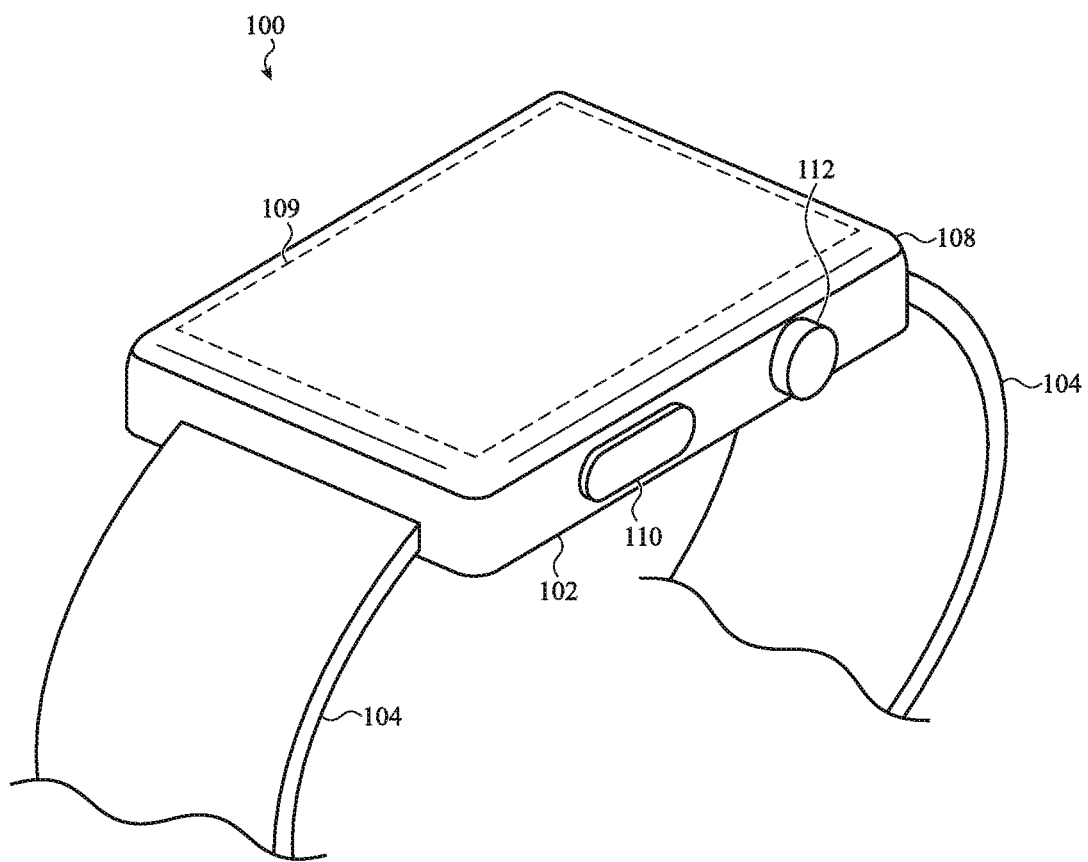
FIG. 1A is a first view of a sample electronic device incorporating a fluid-based pressure-sensing device.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

Embodiments described herein are generally directed to electronic devices incorporating fluid-based pressure sensors. As one non-limiting example, an electronic smart watch may incorporate, house, or otherwise employ an oil-filled pressure sensor as a barometric pressure sensor. As another non-limiting example, an oil-filled pressure sensor may be incorporated into a mobile phone, tablet computing device, laptop computing device, personal digital assistant, digital media player, wearable device (including glasses, jewelry, clothing, and the like) to measure environmental and/or internal pressure of the incorporating electronic device. Output from the pressure sensor may be used to determine the device's elevation, velocity, direction of motion, orientation, and so on. The pressure sensor (and any pressure sensor described with respect to any embodiment herein) may be a piezoresistive, capacitive, optical, optoelectronic, electromagnetic, potentiometric, or other suitable pressure sensor.

In many embodiments the fluid-based pressure sensor is relatively small, for example having a volume of approximately 27 cubic millimeters or less, or having dimensions of approximately 3 mm by 3 mm by 3 mm (or less in any given dimension). A pressure sensor with such a relatively small volume and/or dimensions may provide design flexibility for an electronic device by freeing up interior space for other components, by being able to be positioned within an enclosure at certain places where larger sensors may not fit, by providing additional space for a larger battery, and so on.

Further, an electronic device incorporating a fluid-based pressure-sensing device (such as a pressure sensor within an oil-filled enclosure) may be configured to measure changes in pressure with greater accuracy than electronic devices employing other types of pressure sensors. Additionally, by isolating the pressure sensor from an external environment, the sensor may be at least partially shielded from corrosion, water infiltration, chemical degradation, thermal stresses, contaminants, and the like.

Typically, although not necessarily, the enclosure of the fluid-based pressure-sensing device is made from metal, ceramic, or another material that is relatively durable. A diaphragm may be coupled to the enclosure and may be made from a material having a low Young's modulus, such that the diaphragm may flex or bend under an external force (such as a pressure) and return to its rest state when the external force is relieved or otherwise ceases. In some embodiments the diaphragm may have a high Young's modulus but may be dimensioned such that it nonetheless bends or flexes as described above; the shape, thickness, and/or other dimension may be controlled so that the diaphragm may flex and return as discussed.

The fluid-based pressure-sensing device is typically, although not necessarily, filled with a fluid that is chemically inert with respect to common contaminants and chemicals. As one non-limiting example, the fluid may be silicone oil or another silicone fluid. Further, the fluid is generally incompressible. By using an incompressible fluid (again, such as a silicone oil or other silicone fluid), an external force (e.g., external pressure) may deform the diaphragm inward towards an interior of the enclosure, thereby exerting pressure on the pressure sensor within the enclosure and permitting the pressure sensor to function.

In some embodiments, the electronic device is an electronic smart watch and the fluid-based pressure-sensing device is positioned within a housing of the electronic smart watch. The fluid-based pressure-sensing device may be positioned within a volume defined, at least in part, by the housing. This volume may be coupled to atmosphere external to the watch through a channel defined in the housing. In some embodiments, this channel may be inside a lug or other receptacle configured to accept a watch band. In other embodiments, the channel may be part of, or define, an audio port through which sound may enter or exit the enclosure (such as a microphone or speaker opening).

Coupling the volume in which the fluid-based pressure-sensing device sits to external atmosphere ensures that the pressure-sensing device measures (or is capable of measuring) atmospheric pressure of the environment rather than an internal pressure within the watch. In some embodiments, the channel between the volume and external atmosphere may be sized and/or shaped to reduce or prevent ingress of water, dust, and/or other contaminants. Likewise, in some embodiments a screen, filter, or other structure may be placed in the channel to prevent ingress into the volume of water, dust, and/or other contaminants.

Figure 1B:
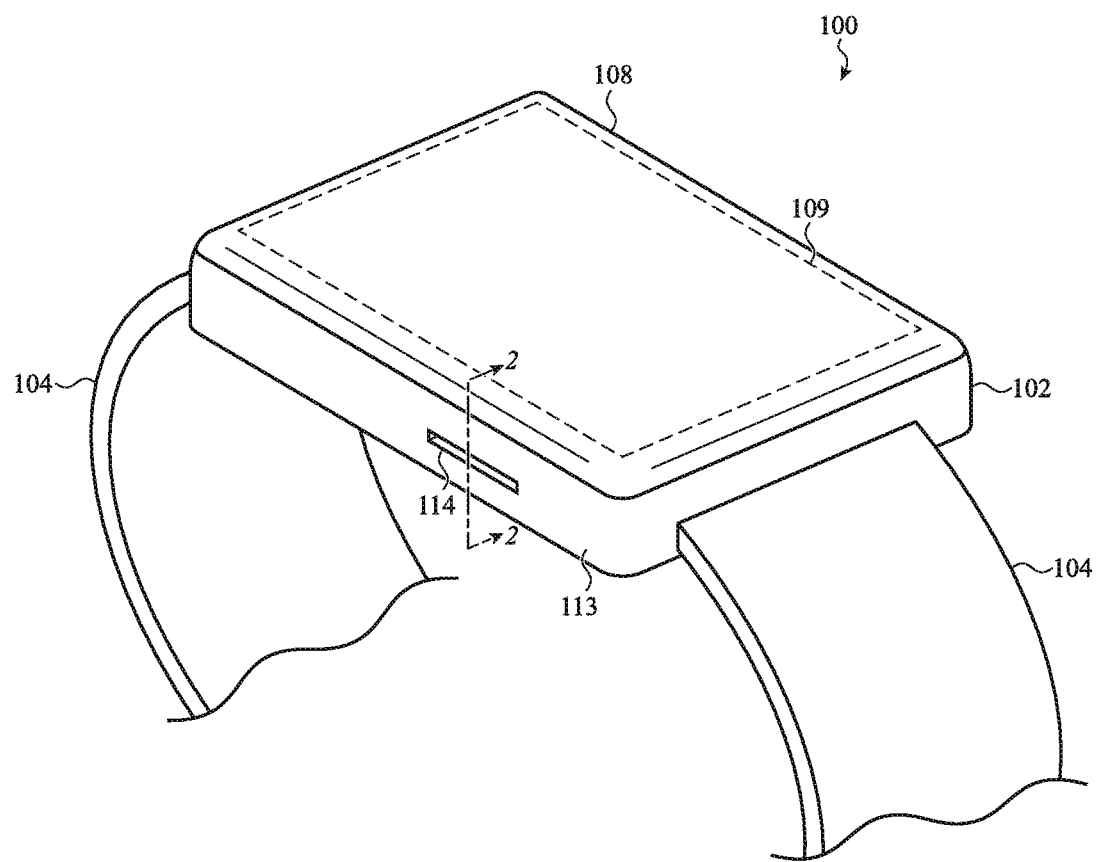
FIG. 1B is a second view of a sample electronic device incorporating a fluid-based pressure-sensing device.

FIGS. 1A-1B depict a sample electronic device 100. The electronic device 100 is depicted as an electronic watch (e.g., a smart watch), though this is merely one example embodiment of an electronic device and the concepts discussed herein may apply equally or by analogy to other electronic devices, including mobile phones (e.g., smartphones), tablet computers, notebook computers, head-mounted displays, digital media players (e.g., mp3 players), or the like. The electronic device 100 may incorporate a fluid-based pressure-sensing device, as described herein.

The electronic device 100 includes a housing 102 and a band 104 coupled to the housing 102. The band 104 may be configured to couple the electronic device 100 to a user, such as to the user's arm or wrist. A portion of the band 104 may be received in a channel that extends along an exterior side of the housing 102, as described herein. The band 104 may be secured to the housing 102 within the channel to maintain the band 104 to the housing 102.

The electronic device 100 also includes a transparent cover 108 (also referred to simply as a "cover") coupled to the housing 102. The cover 108 may define a front face of the electronic device 100. For example, in some cases, the cover 108 defines substantially the entire front face and/or front surface of the electronic device. The cover 108 may also define an input surface of the device 100. For example, as described herein, the device 100 may include touch and/or force sensors that detect inputs applied to the cover 108. The cover 108 may be formed from or include glass, sapphire, a polymer, a dielectric, or any other suitable material.

The cover 108 may cover at least part of a display 109 that is positioned at least partially within the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid-crystal display (LCD), organic light emitting diode display (OLED), or any other suitable components or display technology.

The display 109 may include or be associated with touch sensors and/or force sensors that extend along the output region of the display and which may use any suitable sensing elements and/or sensing techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described below.

The electronic device 100 also includes a crown 112 having a cap, protruding portion, or component(s) or feature(s) (collectively referred to herein as a "body") positioned along a side surface of the housing 102. At least a portion of the crown 112 (such as the body) may protrude from, or otherwise be located outside, the housing 102, and may define a generally circular shape or a circular exterior surface. The exterior surface of the body of the crown 112 may be textured, knurled, grooved, or may otherwise have features that may improve the tactile feel of the crown 112 and/or facilitate rotation sensing.

The crown 112 may facilitate a variety of potential user interactions. For example, the crown 112 may be rotated by a user (e.g., the crown may receive rotational inputs). Rotational inputs of the crown 112 may zoom, scroll, rotate, or otherwise manipulate a user interface or other object displayed on the display 109 (among other possible functions). The crown 112 may also be translated or pressed (e.g., axially) by the user. Translational or axial inputs may select highlighted objects or icons, cause a user interface to return to a previous menu or display, or activate or deactivate functions (among other possible functions). In some cases, the device 100 may sense touch inputs or gestures applied to the crown 112, such as a finger sliding along the body of the crown 112 (which may occur when the crown 112 is configured to not rotate) or a finger touching the body of the crown 112. In such cases, sliding gestures may cause operations similar to the rotational inputs, and touches on an end face may cause operations similar to the translational inputs. As used herein, rotational inputs include both rotational movements of the crown (e.g., where the crown is free to rotate), as well as sliding inputs that are produced when a user slides a finger or object along the surface of a crown in a manner that resembles a rotation (e.g., where the crown is fixed and/or does not freely rotate). In some embodiments, rotating, translating, or otherwise moving the crown 112 initiates a pressure measurement by a pres sure-sensing device (such as a fluid-based pressure-sensing device) within the electronic device 100. The pressure-sensing device is described in more detail below with respect to FIGS. 3-11.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 109, to activate or deactivate functions (e.g., to silence an alarm or alert), or the like.

FIG. 1B depicts another view of the electronic device 100. As shown, the housing 102 may include a side wall 113, which may define one or more exterior side surfaces of the housing 102 (and thus of the device 100). In some cases, the side wall 113 extends around the entire periphery of the device. As described herein, the side wall 113 may at least partially define an interior volume of the housing 102.

The side wall 113 may define openings 114. While multiple openings 114 are shown, the side wall 113 may have more or fewer openings than shown, such as a single opening 114, or three, four, or more openings 114. Further, while the device 100 shows the openings 114 in the side wall 113, they may be positioned elsewhere, such as through a back or bottom wall of the device 100.

As described in more detail herein, at least one opening 114 may couple an external environment to a volume within the housing 102, in which components such as a fluid-based pressure-sensing device are positioned. The opening 114 may allow air pressure equalization between the volume and the external environment around the device 100, thus allowing the fluid-based pressure-sensing device to achieve accurate readings of the ambient air pressure.

In some embodiments, the opening 114 may also allow sound output from an internal speaker to exit the housing 102, such that sound output from the speaker can be heard by a wearer and/or other observers. In some cases, the opening 114 is completely open, with no screen, mesh, grate, or other component or material obstructing air flow between the first volume. In other cases, the opening 114 may be covered by a screen, mesh, grate, or other component or material, which may help prevent debris, dust, liquid, or other contaminants from entering the housing 102.

Figure 2:
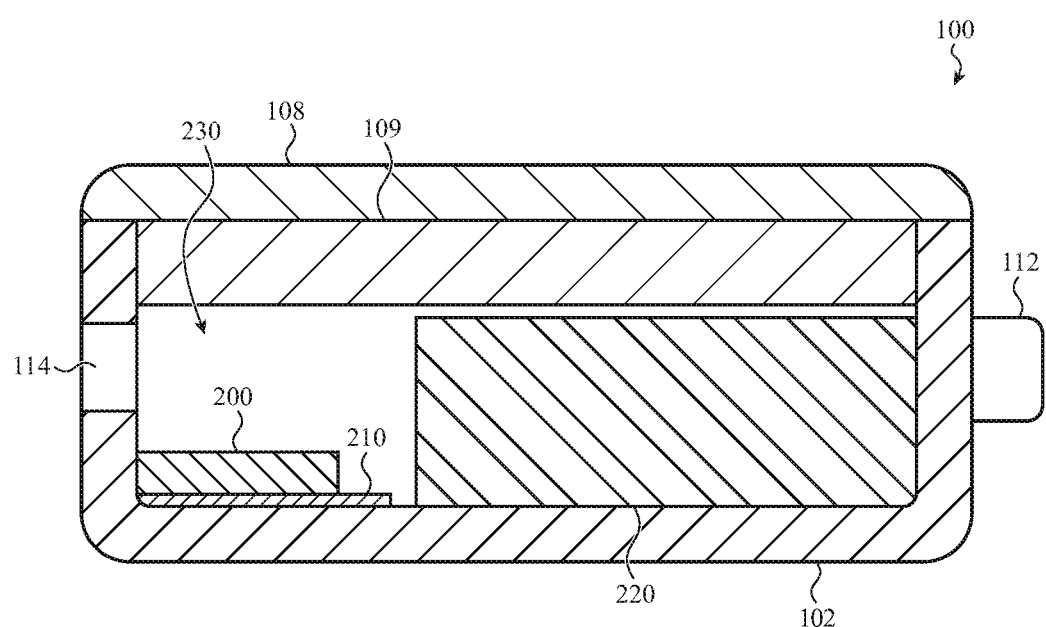
FIG. 2 is a cross-section view taken along line 2-2 of FIG. 1B, showing the fluid-based pressure-sensing device positioned within the sample electronic device.

FIG. 2 is a cross-section view of the electronic device 100, taken along line 2-2 of FIG. 1B. As shown in FIG. 2, the housing 102 of the electronic device 100 defines an interior volume 230 and a channel 114 coupling the interior volume to external atmosphere (e.g., atmosphere outside the electronic device 100). Thus, a pressure of the interior volume 230 and external atmosphere is substantially the same, and may equalize over time as one or the other changes.

In some embodiments a filter, screen, or the like may be positioned in the channel 114 to prevent or reduce ingress of contaminants, liquids, and so on into the interior volume 230.

A fluid-based pressure-sensing device 200 (also referred to simply as a "pressure-sensing device") is positioned within the interior volume 230 of the housing 102. The fluid-based pressure-sensing device 200 may measure the pressure of the interior volume 230 and thus, the external atmosphere (insofar as the interior volume 230 and external atmosphere are coupled by the channel 114). In some embodiments the pressure-sensing device 200 is directly coupled to the housing 110, while in others the device 200 is coupled to a substrate 210 that is in turn directly or indirectly coupled to the housing 102. The substrate 210 may be a circuit board, support, strut, projection, or other structure.

A battery and other electronic components 220 also may be positioned in the interior volume 230 of the housing 102. Electronic components may include one or more processing units, sensors, output devices, memory, storage devices, displays, audio devices (including speakers and microphones), and so on, specifically including components discussed below with respect to FIG. 12. Generally, the battery and other electronic components 220 occupy a majority of the interior volume 230. In some embodiments, the substrate 210 may electrically couple the fluid-based pressure-sensing device 200 to the battery, a processing unit, and/or other components 220. The substrate may route power to the pressure-sensing device 200, route an output of the pressure-sensing device 200 to a processing unit or other electronic component 220, and so on. Thus, the substrate 210 may serve both as a support for the pressure-sensing device 200 and an electrical path between the pressure-sensing device 200 and other components 220.

The electronic device 100 also includes a display 109 at least partially within the interior volume 230 and protected by the cover 108. Typically, the display 109 is configured to display information (as discussed in more detail below); this information may include the pressure sensed by the fluid-based pressure-sensing device 200. In some embodiments, the processing unit 220 may use the output of the pressure-sensing device 200 to modify information shown on the display 109 or an operation of the electronic device 100.

FIG. 2 also shows the crown 112 extending from the housing 102. Rotating and/or translating the crown 112 with respect to the housing 102 may initiate an input to the electronic device 100. For example, rotating and/or translating the crown 112 may cause the fluid-based pressure-sensing device 200 to measure a pressure of the volume 230. Rotating and/or translating the crown 112 may also cause the measured pressure to be shown on the display 109, for example by instructing the processing unit to change the information shown on the display.

Figure 3:
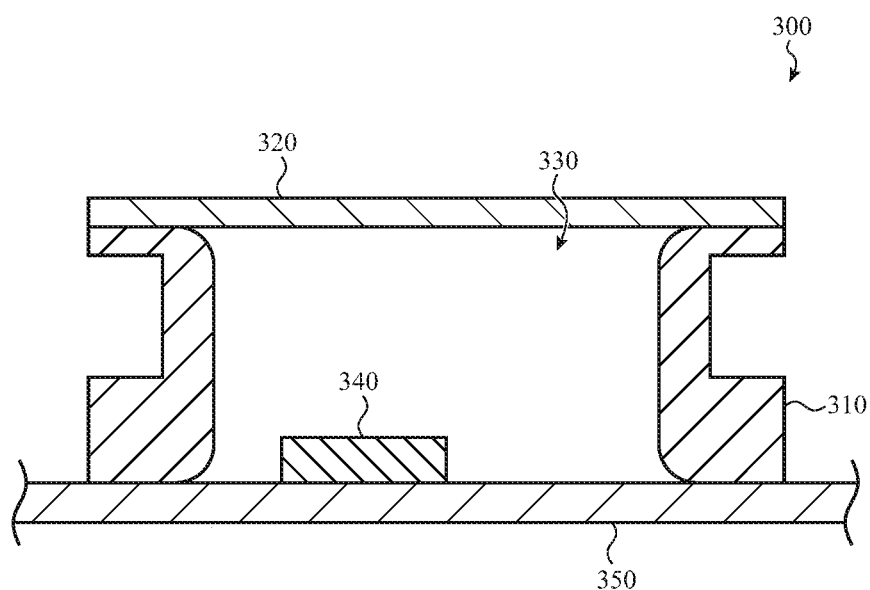
FIG. 3 is a cross-section view of a sample fluid-based pressure-sensing device, namely an oil-filled pressure-sensing device.

Particulars of a fluid-based pressure-sensing device will now be discussed. FIG. 3 is a cross-section of an example oil-filled pressure-sensing device 300 (hereinafter "device 300"). The oil-filled pressure-sensing device 300 generally can be surface mounted to a substrate 350, such as a circuit board, ceramic, metal, or the like. The pressure-sensing device typically includes an enclosure 310, a diaphragm 320, a sensing medium 330, and a pressure sensor 340 within the enclosure 310 and encapsulated in the sensing medium 330, as shown in FIG. 3.

In some embodiments the enclosure 310 is about three millimeters in each dimension and defines an opening on a side opposite the substrate 350. Accordingly, in some embodiments the fluid-based pressure-sensing device 300 has a volume of about 27 cubic millimeters, or generally 30 cubic millimeters or less. Typically, the enclosure 310 is coupled to the substrate 350; in some embodiments the substrate 350 may cooperate with the enclosure 310 and diaphragm 320 to contain the sensing medium 330, while in others the enclosure 310 may form a bucket or container that, along with the diaphragm 320, contains the sensing medium 330.

In some embodiments, the enclosure 310 includes a bottom cup-shaped section that is hermetically joined to a top cap. The bottom section can be formed from ceramic or silicon and the top cap may define walls made of ceramic or silicon. In one or more embodiments, the enclosure 310 may have an aspect ratio about ⅓ to ⅕. Put another way, the enclosure 310 may be three to five times as tall and/or wide as it is high.

The opening in the enclosure 310 may be hermetically sealed by the diaphragm 320. The diaphragm 320 may be made from a material having a low Young's modulus, such as polyimide or another suitable polymer, or a moderate or high Young's modulus but that is dimensioned to bend and/or flex. In some embodiments the diaphragm 320 may be formed from multiple layers, such as a polyimide layer coupled to one or more metal layers, or even positioned between metal layers. The polyimide layer can be on an external face or an internal face of the diaphragm 320. An isolation diaphragm 320 made from the foregoing materials, or combinations thereof, may reduce hydrostatic pressure on the pressure sensor 340. In some embodiments, the diaphragm 320 is at least partially corrugated.

The pressure sensor 340 is positioned inside the enclosure 310, coupled to the substrate 350 (or to the enclosure, in some embodiments) and encapsulated by the sensing medium 330, which may be a silicone oil. Generally, the isolation diaphragm 320 shields the pressure sensor from contaminants, such as dust, water, chemicals, and the like. In certain embodiments, the sensing medium 330 may cooperate with the diaphragm 320 to shield the pressure sensor 340 while transmitting pressure from the diaphragm 320 to the pressure sensor 340. The sensing medium 330 may prevent chemical corrosion of the pressure sensor 340 insofar as it shields the pressure sensor 340 from corrosives and is generally chemically inert (at least with respect to common corrosives). Thus, the isolation diaphragm 320 (and, in some embodiments, the sensing medium 330) may extend a life of the pressure sensor 340 and ensure operation of the pressure-sensing device.

Generally, the sensing medium 330 can transfer a pressure exerted on the diaphragm 320 to the pressure sensor 340. In some embodiments, the sensing medium 330 fills a volume of the enclosure 310 or a volume defined by the enclosure 310 and substrate 350. In some embodiments, the pressure sensor 340 is a monolithic pressure sensor die including a micro-electromechanical system (MEMS) pressure sensor integrated with an application-specific integrated circuit (ASIC). The monolithic pressure sensor die can be coupled to the substrate 350 via flip-chip solders. Additionally, a stress isolator (such as a spring) may be positioned between the pressure sensor 340 and the flip-chip solder, or may be formed in the die of the pressure sensor 340 itself. Such a stress isolator may prevent parasitic stresses from being transmitted from the substrate 350, through the solder, and to the pressure sensor 340. This may prevent or reduce sensing error in the pressure sensor 340 that may otherwise occur in response to mechanical and/or thermal stresses exerted on the enclosure 310 and/or substrate 350.

In some embodiments, the substrate 350 defines a hole that is sealed after filling the volume of the enclosure 310 with the silicone oil 330. The walls of the hole may be metalized; this metal may extend to an external surface of the substrate 350 and serve as a contact point for solder. The solder, in turn, may seal the hole.

The diaphragm 320 may isolate the sensing medium 330 and pressure sensor 340 from environmental contaminants such as water, dust and chemicals, thus providing a second shield against external contaminants for the pressure sensor (e.g., in addition to the environmental shield provided by the sensing medium 330). Further, the diaphragm 320 may flex, bend, or otherwise deform in response to a pressure exerted on the diaphragm. When the diaphragm 320 deforms toward the substrate 350 (e.g., into the volume of the enclosure 310), it deforms or otherwise shifts or moves the sensing medium 330, thereby transmitting the exerted pressure to the pressure sensor 340. Thus, the pressure sensor 340 may measure a pressure (or other force) exerted on the diaphragm 320. Accordingly, the diaphragm both protects the pressure sensor 340 from environmental contaminants and hazards and facilitates the pressure sensor's measurement of environmental pressure. Typically, the diaphragm 320 hermetically seals the volume inside the enclosure 310. In some embodiments the isolation diaphragm 320 is coupled to the enclosure 310 using an inside-oil-soldering process, or other suitable processes.

Figure 4A:
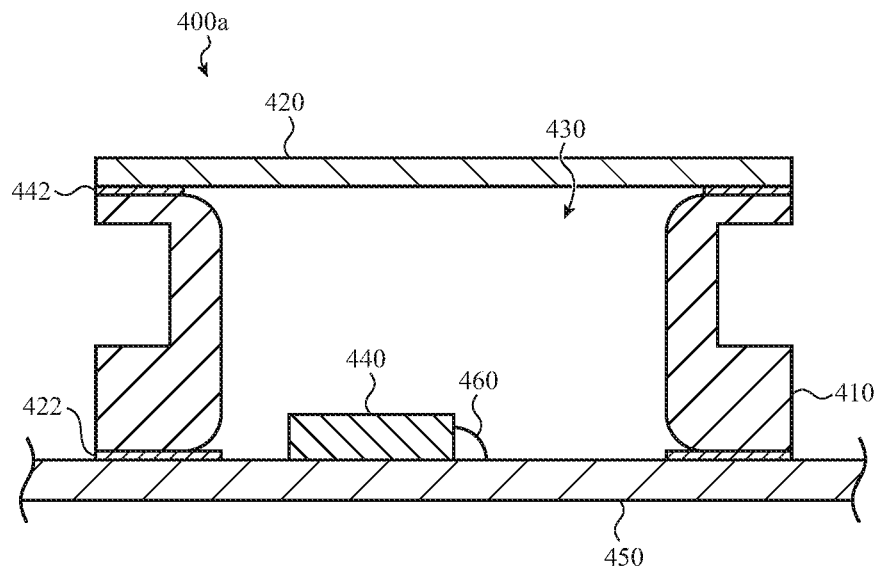
FIGS. 4A-4B are cross-section views of example oil-filled pressure-sensing devices, in accordance with one or more embodiments.

FIG. 4A is a cross-section view of an example oil-filled pressure-sensing device 400A, particularly showing sample details of how various parts may be coupled together. The oil-filled pressure-sensing device 400A shown in the cross-section view of FIG. 4A is waterproof and resists intrusion of contaminants, liquids and the like; both the diaphragm and sensing medium (e.g., silicone oil) shield the pressure sensor.

The oil-filled pressure-sensing device 400A (hereinafter "device 400A") includes a pressure sensor 440 disposed on a substrate 450. The substrate 450 is coupled to a metal enclosure 410 via an interface layer 422 (e.g. an adhesive layer). A top opening of an oil-filled space 430 of the device 400A is closed using an isolation diaphragm 420. The isolation diaphragm 420 can be soldered to the enclosure 410 using a soldering ring 442, or may be attached thereto by soldering, brazing, welding, pressure-sensitive adhesive, a pressure-sensitive tape, an epoxy, an acrylic, or a silicone adhesive. In one or more embodiments, the isolation diaphragm 420 can be made of a polymer material, for example, polyimide and/or KAPTON. Using material having a low Young's modulus, such as a polymer, (or a material with a high Young's modulus that is configured to bend or flex) as the isolation diaphragm can significantly reduce hydrostatic pressure on the sensor. In some embodiments, the isolation diaphragm 420 may further include a metallic coating (e.g., copper) on one or both surfaces (e.g., top and/or bottom surfaces). In one or more embodiments, the soldering ring 442 may include plating layers made of material such as copper, nickel, or gold. In one or more embodiments, a hot-bar or an inductive soldering or a spot or laser welding process is used for the inside-oil-soldering process. Using the hot-bar or other welding processes can melt the soldering ring 442 and cause sealing of the isolation diaphragm 420 to the enclosure 410. As further discussed herein, the use of the hot-bar or other welding processes is performed inside oil content of an oil container.

In some embodiments, the pressure sensor 440 of the fluid-based pressure-sensing device 440 is a MEMS pressure sensor that is coupled (for example by wire-bonding or other bonding techniques) to an ASIC. In one or more embodiments, the metal enclosure 410 can be made of stainless steel, or other suitable metals, and can be plated with another suitable metal such as silver. The pressure sensor 440 may be electrically coupled to the substrate 450 by an electrical connector 460 and the substrate 450 may, in turn, electrically couple the sensor 440 to a battery, processing unit, or other electrical component outside the fluid-based pressure-sensing device 400A.

Figure 4B:
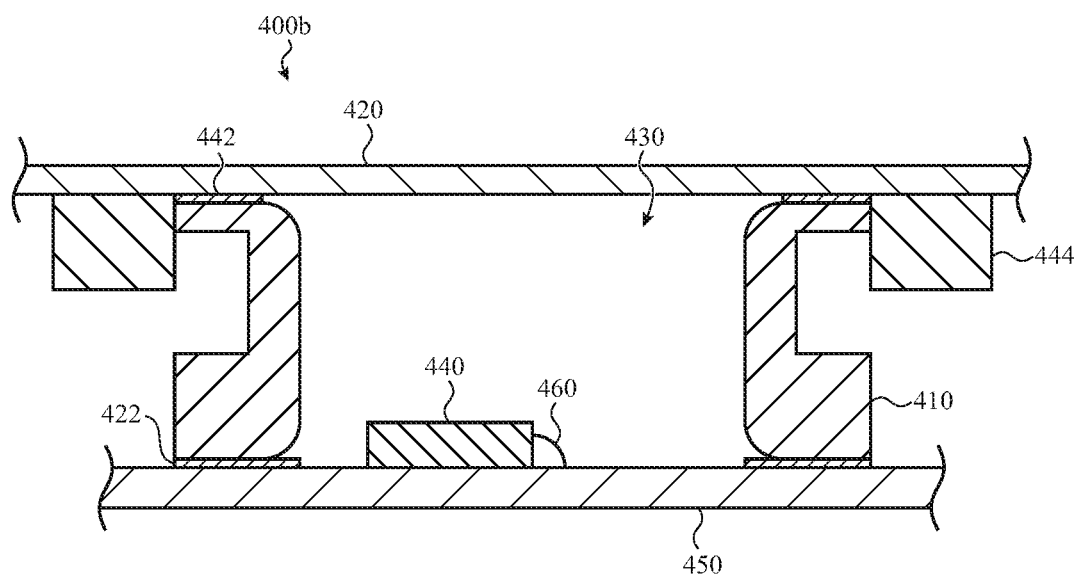

FIG. 4B illustrates another sample oil-filled pressure-sensing device 400B that is similar to the device 400A of FIG. 4A, except that the isolation diaphragm 420 extends past the sides of the enclosure 410 to abut a plug-and-guide ring structure 444. The plug-and-guide ring structure 444 assists in holding and aligning the isolation diaphragm 420 to the enclosure 410, particularly while the diaphragm 420 is being coupled to the enclosure. The plug-and-guide ring structure 444 further may set a fill level for the silicone oil 430 (or other sensing medium) before the isolation diaphragm 420 is coupled to the enclosure 410. In some embodiments the plug-and-guide ring structure 444 is removed once the enclosure 410 and diaphragm 420 are coupled to one another, while in other embodiments the ring structure 444 remains and may reinforce the enclosure 410.

Figure 5:
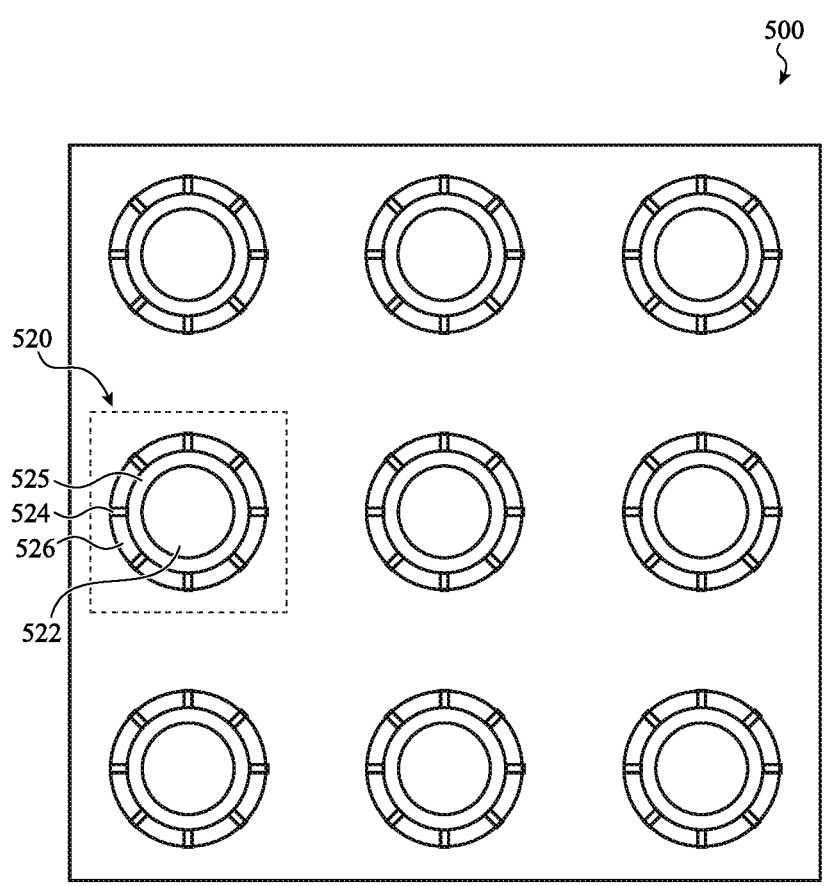
FIG. 5 illustrates an example carrier sheet of diaphragms for the oil-filled pressure-sensing devices of FIGS. 4A-4B, in accordance with one or more embodiments.

FIG. 5 is a schematic diagram illustrating an example carrier sheet 500 defining multiple isolation diaphragms 522 that may be used with any embodiment described herein. The carrier sheet 500 may be made of a sheet or a tape of a polymer material (e.g., polyimide or KAPTON), on which patterns of a cell 520 of an isolation diaphragm are created. Each cell 520 includes an isolation diaphragm 522 with a metallic plated ring 525, which is coupled to the rest of the carrier sheet 500 by tie bars 524. In between the tie bars 524, air gaps 526 allow aligning the isolation diaphragm 522 on top of the metal enclosure (e.g., enclosure 310 of FIG. 3, enclosure 410 of FIGS. 4A-4B, and so on). The tie bars 524 are removed after the aligning process to detach the isolation diaphragm 522 from the carrier sheet 500. The use of the carrier sheet 500, on which a large number of cells 520 can be imprinted, facilitates leveraging automation in the manufacturing of the pressure-sensing devices of the subject technology.

Figure 6:
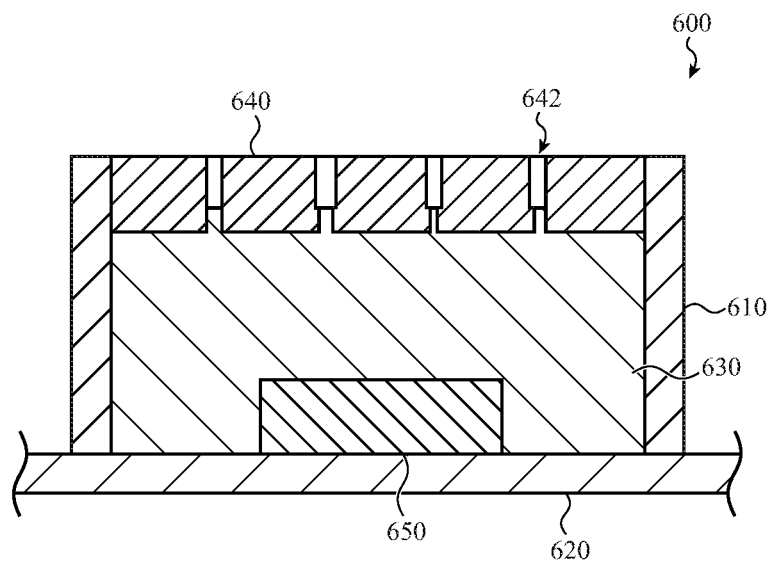
FIG. 6 illustrates an example oil-filled pressure-sensing device with a perforated sealing plug, in accordance with one or more embodiments.

FIG. 6 is a schematic diagram illustrating an example oil-filled pressure-sensing device 600 with a perforated sealing plug, in accordance with one or more embodiments. The oil-filled pressure-sensing device 600 (hereinafter "device 600") includes a pressure sensor 650 that is disposed on a substrate 620. The pressure sensor 650 is encapsulated by oil or another incompressible sensing medium contained within the space 630. The perforated sealing plug 640 is used as a semi-isolation diaphragm and is coupled (e.g., sealed) to a metal enclosure 610 of the device 600. The holes 642 of the perforated sealing plug 640 keep the oil inside the space inside the enclosure 610, while allowing the oil to be partially exposed to the environment and can expand and contract temperature changes. The holes 642 can also prevent or reduce a likelihood of formation of air bubbles inside the oil-filled space 630. In one or more embodiments, the perforated sealing plug 640 is made of a polymer (e.g., polyimide or KAPTON) film with small holes with diameters on the order of about 20 µm. Even though the oil may be partially exposed to the environment, it nonetheless may act as a shield against contaminants and corrosion for the pressure sensor 650.

Figure 7:
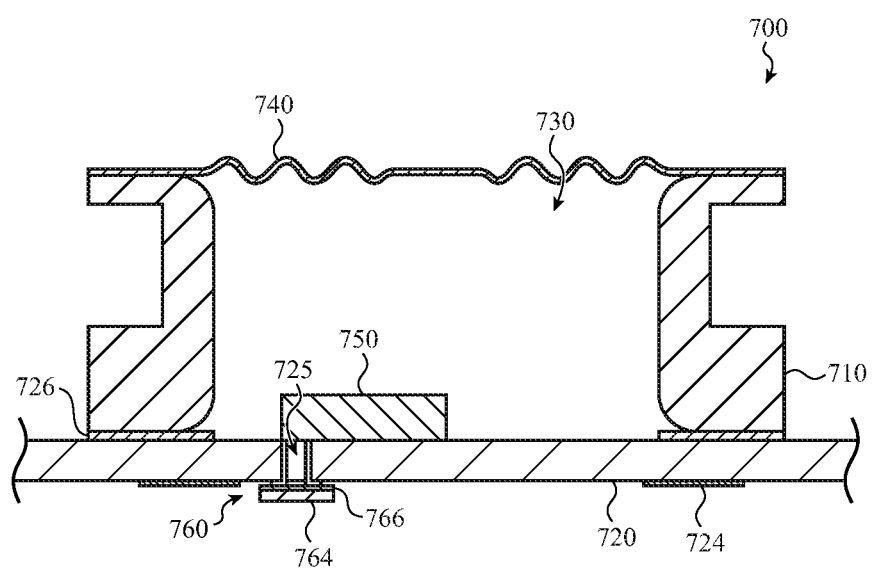
FIG. 7 is a cross-section view of an example oil-filled pressure-sensing device, in accordance with one or more embodiments.

FIG. 7 is a schematic diagram illustrating a cross-section view of an example oil-filled pressure-sensing device 700, in accordance with embodiments described herein. The example oil-filled pressure-sensing device 700 includes a pressure sensor 750 disposed on a substrate 720. The pressure sensor 750 is protected and encapsulated by a sensing medium 730 (e.g., oil) that fills a space formed by an enclosure 710 and the substrate 720 of the device 700. Generally, an adhesive 726 (or other bond, interface layer, retainer, or the like) affixes the enclosure 710 to the substrate 720. As seen from FIG. 7, an isolation diaphragm 740 of the device 700 is corrugated. The corrugated isolation diaphragm 740 has the benefit of permitting expansion and/or contraction of the oil 730 inside the space inside the enclosure 710. In one or more embodiments, the isolation diaphragm 740 can be made of a polymer material, for example, polyimide and/or KAPTON. In some embodiments, the isolation diaphragm 740 may further include a metallic coating (e.g., copper) on one or both surfaces (e.g., top and/or bottom surfaces).

The substrate 720 defines a hole 725 through which the space inside the enclosure 710 can be filled with oil, for example by submerging the body of the device 700 inside an oil container. The walls of the hole 725 may be plated with a suitable metal that extends out to an external surface of the substrate 720 to allow soldering of a solder pad 760 to seal the hole 725 after filling the space. Soldering the solder pad 760 can be performed inside the oil in the oil container. In one or more embodiments, the solder pad 760 includes a flat metal layer 764 covered by a high temperature solder layer 766. The solder pad 760 may be coupled directly to the substrate 720 or may be coupled to a connector 724 as shown in FIG. 7. In other embodiments, soldering, brazing, welding, pressure-sensitive adhesive, a pressure-sensitive tape, an epoxy, an acrylic, or a silicone adhesive may be used to affix the solder pad to the substrate.

Figure 8A:
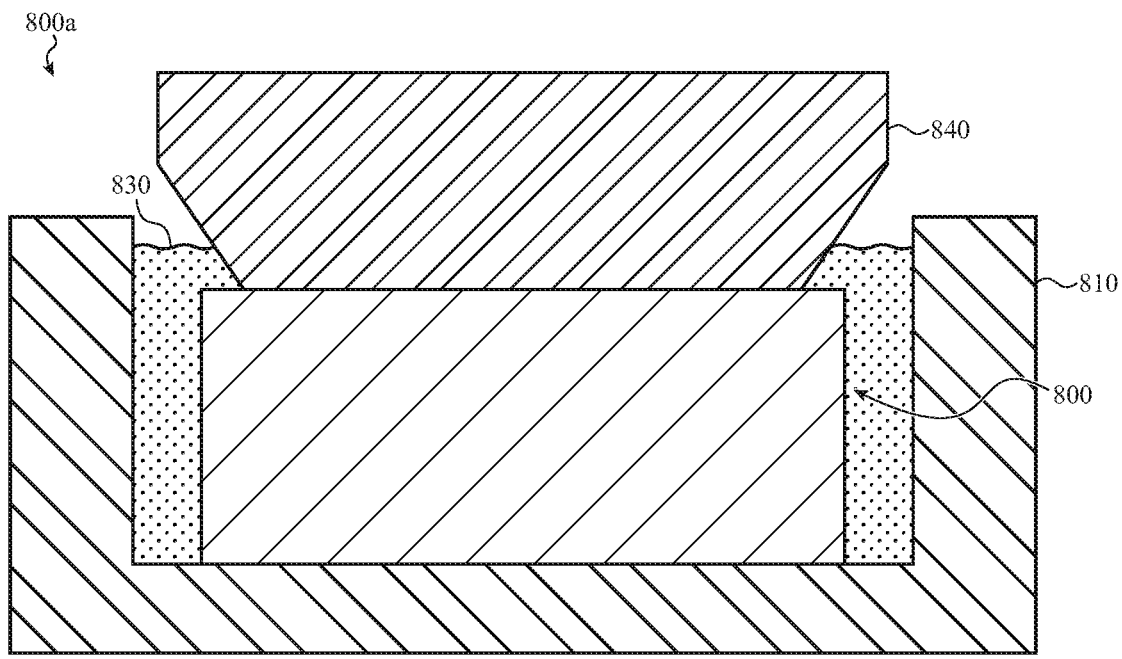
FIGS. 8A-8B illustrate example hot-bar sealing apparatuses for oil-filled pressure-sensing devices, in accordance with one or more embodiments.
Figure 8B:
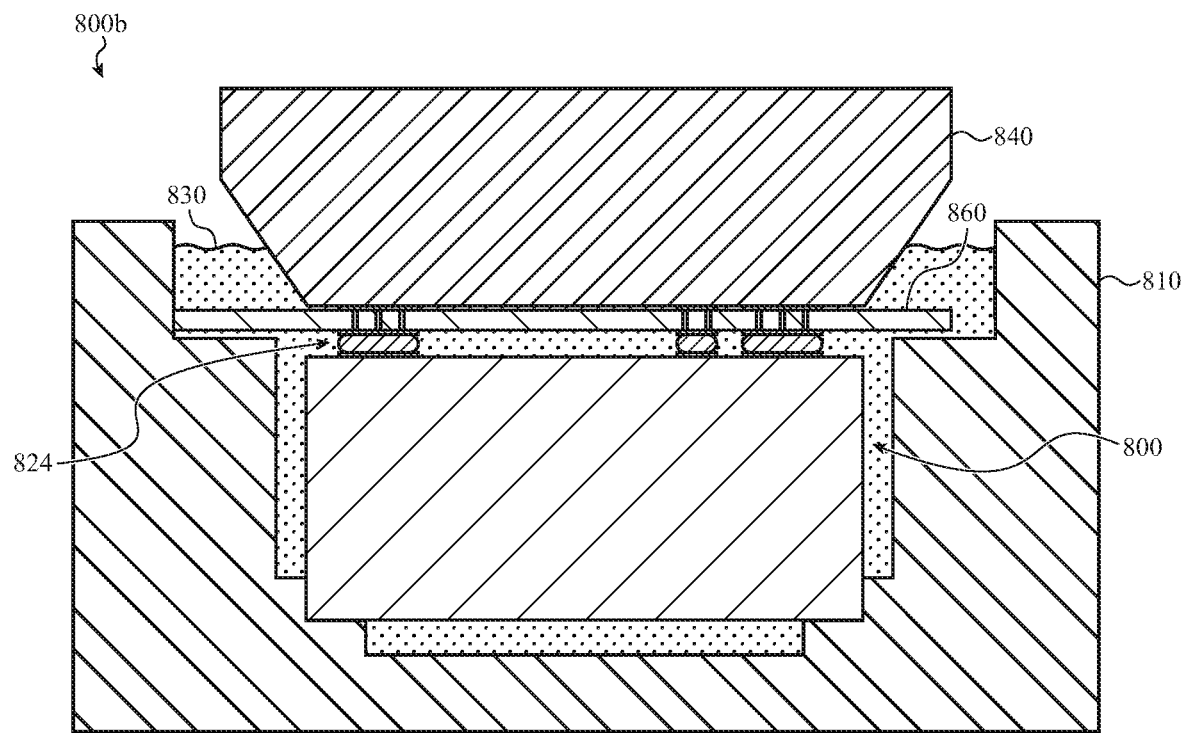

FIGS. 8A-8B are schematic diagrams illustrating example hot-bar sealing apparatuses 800A and 800B for sealing oil-filled pressure-sensing devices, in accordance with one or more embodiments. The example hot-bar sealing apparatus 800A can be used to seal, for example, the pressure-sensing device 300 of FIG. 3 (or any other pressure-sensing device described herein). The apparatus 800A is an oil container 810 in which a pressure-sensing device can be submerged, and a hot bar 840. The oil container 810 can hold the pressure-sensing device 300 in the oil-filed space of the container, which is filled with oil to a level 830. The hot bar 840 is placed on the isolation diaphragm (for example, diaphragm 320 of FIG. 3) and is partially immersed in the oil. The high temperature of the hot bar 840 facilities inside-oil-soldering of the isolation diaphragm to the enclosure of the pressure-sensing device 300. The temperature of the hot bar 840 depends on the solder used and can be a few hundred degrees centigrade.

The example hot-bar sealing apparatus 800B can be used to seal a pressure-sensing device described herein, such as device 700 described with respect to FIG. 7. The device 700 can be placed inside the apparatus 800B upside down, such that the isolation diaphragm 740 is placed on the lower edges of the oil container 810, and the oil sealing hole 725 is soldered and sealed at the same time the circuit board 860 is bonded affixed, soldered, or otherwise attached to the solder pads 824 of device 800. The hot bar 840 is placed on the circuit board 860 and is partially immersed into the oil. The high temperature of the hot bar 840 facilities inside-oil-soldering of the circuit board 860 to the substrate of the device.

Figure 9A:
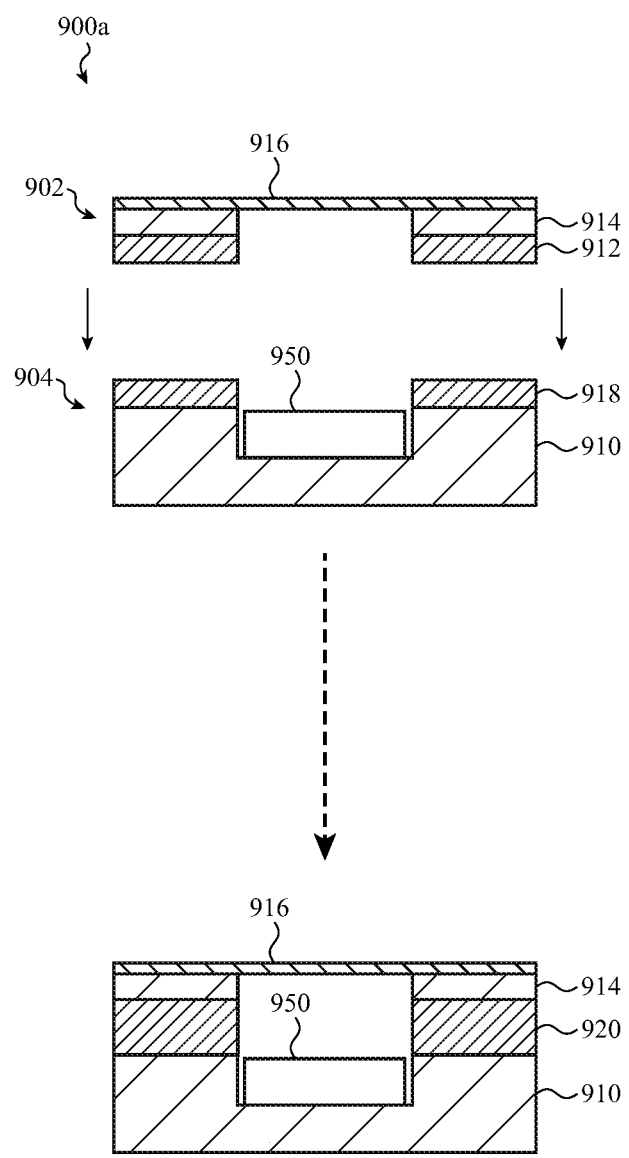
FIGS. 9A-9B illustrate cross-section views of an example oil-filled pressure-sensing device, in accordance with one or more embodiments.
Figure 9B:
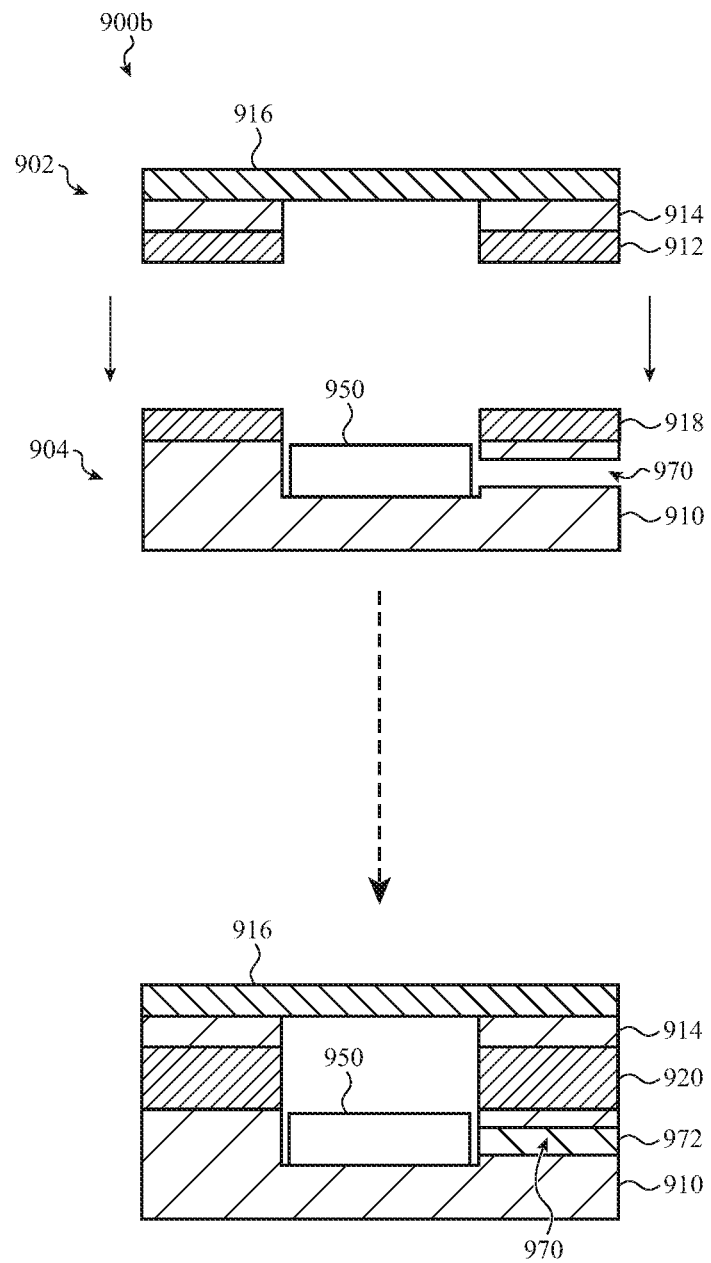

FIGS. 9A-9B are schematic diagrams illustrating cross-section views of example oil-filled pressure-sensing devices 900A and 900B, in accordance with various embodiments. The example oil-filled pressure-sensing device 900A includes a top cap 902 and a bottom cup 904, which mate with or abut one another. When filled with oil and put together, the top cap 902 and bottom cup 904 form an enclosure of the device 900A. The top cap 902 can be fabricated separately and includes a resistance weld layer 912, a low temperature coefficient (LTC) layer 914 (e.g., made of a ceramic, polysilicon, or the like) and an isolation diaphragm 916. The isolation diaphragm 916 (or a portion thereof, such as a metal layer coupled to a polyimide) can be made of steel, a chromium-iron-nickel alloy such as INCONEL, gold, copper, nickel, or silicon, and is grounded by coupling it to a ground. The resistance weld layer 912 can be made of, for example, a resistance weld material (e.g., an iron-nickel alloy) or a braze joint (e.g., SAC 304 or equivalent, as discussed above).

The bottom cup 904 is made of an LTC substrate in the shape of a cup and may also include a resistance weld layer 918 (or braze joint, soldering, welding, pressure-sensitive adhesive, a pressure-sensitive tape, an epoxy, an acrylic, or a silicone adhesive) coupled to a base material 910, which may be formed from an LTC material.

The pressure sensor 950 is disposed in the cup 904. The pressure sensor 950 can include a MEMS pressure sensor integrated with an ASIC. To form the enclosure of the pressure-sensing device the top cap 902 and the bottom cup 904 are fabricated separately, after which the pressure sensor 950 is positioned inside the bottom cup 904. The bottom cup 904 is then filled with oil under ambient vacuum. The top cap 902 and the bottom cup 904 are then submerged inside the oil content (e.g., silicone or fluorinated oil) of an oil container (oil bath) and sealed to one another, and the container is evacuated. This ensures the enclosure (formed from the top cap 902 and bottom cup 904) retains the oil or other sensing medium, thereby shielding the pressure sensor from external contaminants.

The welding of the top cap 902 and the bottom cup 904 is performed inside the oil, for example, by sufficiently raising the temperature to melt the resistance weld layers 912, 918 to complete the welding process of the top cap 902 to the bottom cup 904 inside the oil and under vacuum. The resistance weld layers 912, 918 may combine to form a seal 920 that joins the top cap 902 to the bottom cup 904. In some embodiments, the top cap 902 and bottom cup 904 may be soldered or brazed together, or may be joined by welding, pressure-sensitive adhesive, a pressure-sensitive tape, an epoxy, an acrylic, or a silicone adhesive.

With respect to FIG. 9B, the example oil-filled pressure-sensing device 900B includes a top cap 902 and a bottom cup 904. Description of the top cap 902 is the same as discussed above with respect to FIG. 9A. The bottom cup 904 is similar to the bottom cup 904 of FIG. 9A, except that it includes a hole 970 through which oil may pass to fill the bottom cup.

The device 900B is formed by fabricating the top cap 902 and the bottom cup 906 separately, assembling the pressure sensor 950 inside the bottom cup 906, joining the top cap 902 and the bottom cup 906 by, for example, high-temperature soldering (thereby creating the enclosure around the pressure sensor 950) and filling the enclosure with oil under ambient vacuum through the hole 970. In some embodiments, the isolation diaphragm 916 is pulled from outside by vacuum to prevent stiction to inside space, while the device 900B is evacuated through the hole 970. For evacuation of the space, a three-way valve is used to enable switching from vacuum to oil and letting the vacuumed space inside the enclosure 900B be filled with oil via a gravity pull force. After oil filling is complete a solder plug 972 is used to close the hole 970 by the inside-oil-soldering technique.

FIGS. 10A-10D are schematic diagrams illustrating cross-section views of example oil-filled pressure-sensing devices 1000A-1000D, in accordance with one or more embodiments. The example oil-filled pressure-sensing device 1000A includes a substrate 1020, an enclosure 1010 and an isolation diaphragm 1040. A pressure sensor 1050 is disposed on the substrate 1020. A space inside the enclosure 1000A, formed by the substrate 1020 and the enclosure 1010 is filled with a liquid material such as oil 1030 (e.g., silicone oil), or another incompressible fluid, and the isolation diaphragm 1040 is coupled to the enclosure 1010 inside an oil bath, as described above. The enclosure 1010 can be made of steel or any other suitable metal, and the isolation diaphragm 1040 can be made of a polymer such as polyimide or KAPTON. Using material of low Young's modulus (such as a suitable polymer) as the isolation diaphragm 1040 may significantly reduce hydrostatic pressure on the sensor 1050. In some embodiments, a welding metal ring can be created around the isolation diaphragm 1040 to enable welding to the enclosure 1010. The welding can be done inside oil, as described above, for example, by the inside-oil-welding technique. The substrate 1020 can be made, for example, of a ceramic material or silicon.

Figure 10A:
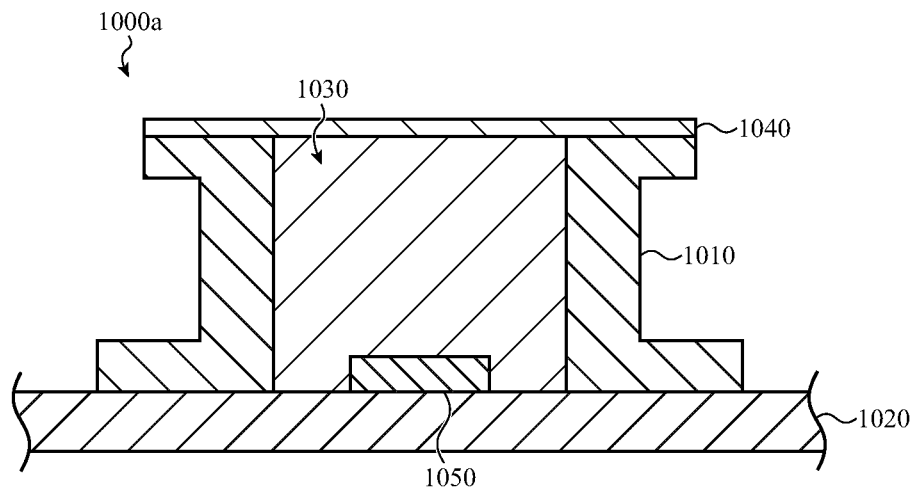
FIGS. 10A-10D illustrate cross-section views of example oil-filled pressure-sensing devices, in accordance with one or more embodiments.
Figure 10B:
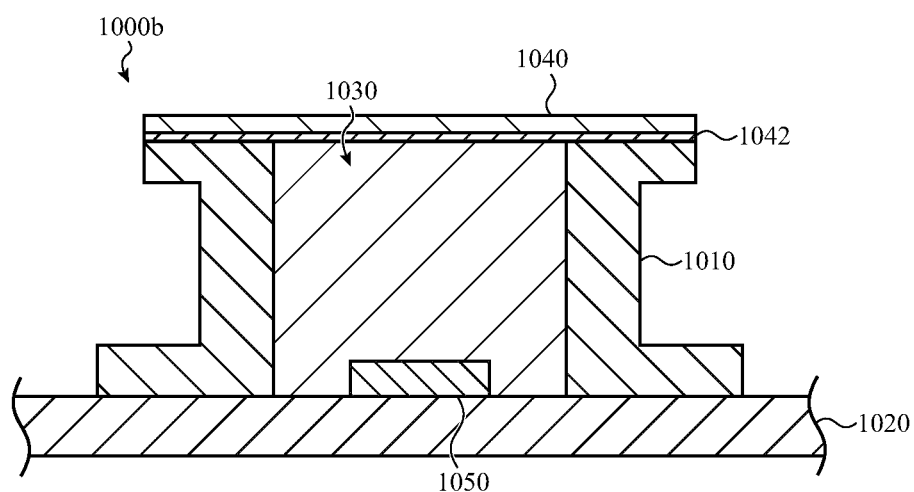

The example oil-filled pressure-sensing device 1000B of FIG. 10B is similar to the device 1000A of FIG. 10A, except for an additional metal layer 1042, which is coupled to the isolation diaphragm 1040 of device 1000B. The metal layer 1042, which can be thin (e.g., a few microns) enables welding of the isolation diaphragm to the enclosure 1010, and further strengthen the isolation diaphragm 1040 (polymer). The metal layer 1042 may also prevent the oil (or other sensing medium) from diffusing into the polyimide. Generally, the metal layer 1042, and/or any other metal layer of a diaphragm as discussed herein, may be made from any suitable metal such as copper, nickel, gold, silver, alloys of the foregoing, and so on.

Figure 10C:
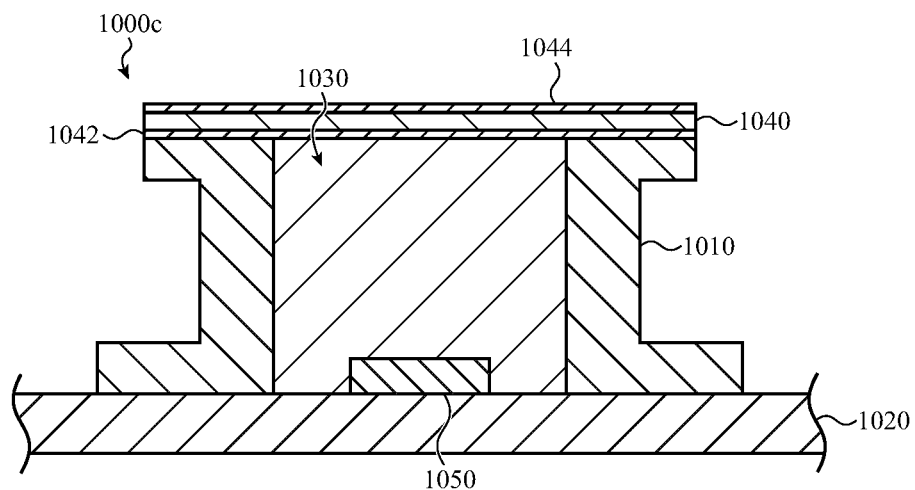

The example oil-filled pressure-sensing device 1000C of FIG. 10C is similar to the device 1000B of FIG. 10B, except for an additional top metal layer 1044, which is coupled to the isolation diaphragm 1040. The top metal layer 1044, which can be thin (e.g., a few microns) may further strengthen the isolation diaphragm by reinforcing the polymer layer while maintaining some ability to deform under pressure and return to a rest (undeformed) state when the pressure is relieved.

Figure 10D:
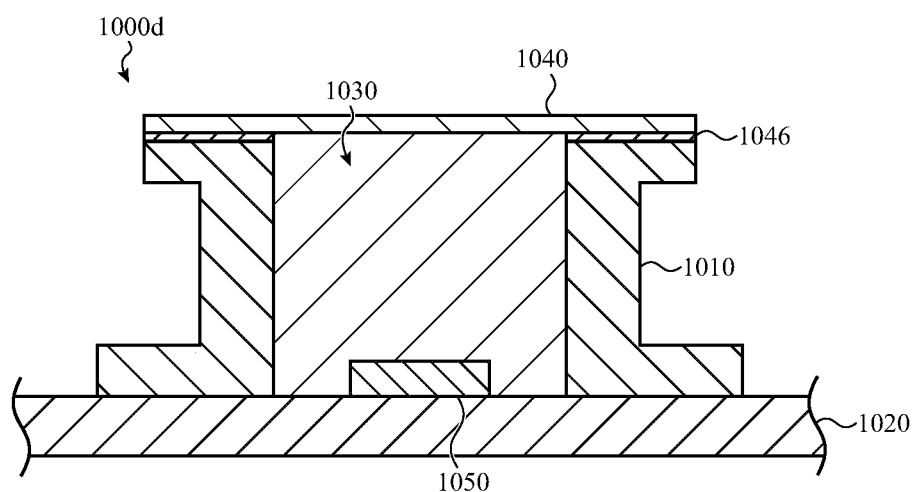

The example oil-filled pressure-sensing device 1000D of FIG. 10D is similar to the device 1000A of FIG. 10A, except for an additional metal layer 1046, which is a metal ring coupled to (e.g., deposited on) the isolation diaphragm 1040. The additional metal layer 1046 can be a thin (e.g., a few microns) layer and enables welding the isolation diaphragm to the enclosure 1010. Alternatively, the diaphragm may be soldered or brazed to the enclosure, or may be attached to the enclosure by welding, pressure-sensitive adhesive, a pressure-sensitive tape, an epoxy, an acrylic, or a silicone adhesive.

Any of the embodiments discussed herein may use a diaphragm formed from a flat or corrugated polymer such as polyimide, TEFLON, ePTFE, polyethylene, polypropylene, and so on. Generally, a corrugated polymer diaphragm 1040 may increase pressure sensitivity and reduce a TCO (temperature coefficient of offset) of the pressure sensor within the fluid-based pressure sensing device. Likewise, any diaphragm discussed herein may be hydrophobic, oleophobic, or both; such diaphragms may be made from hydrophobic and/or oleophobic materials or may be coated with hydrophobic and/or oleophobic coatings.

Figure 11A:
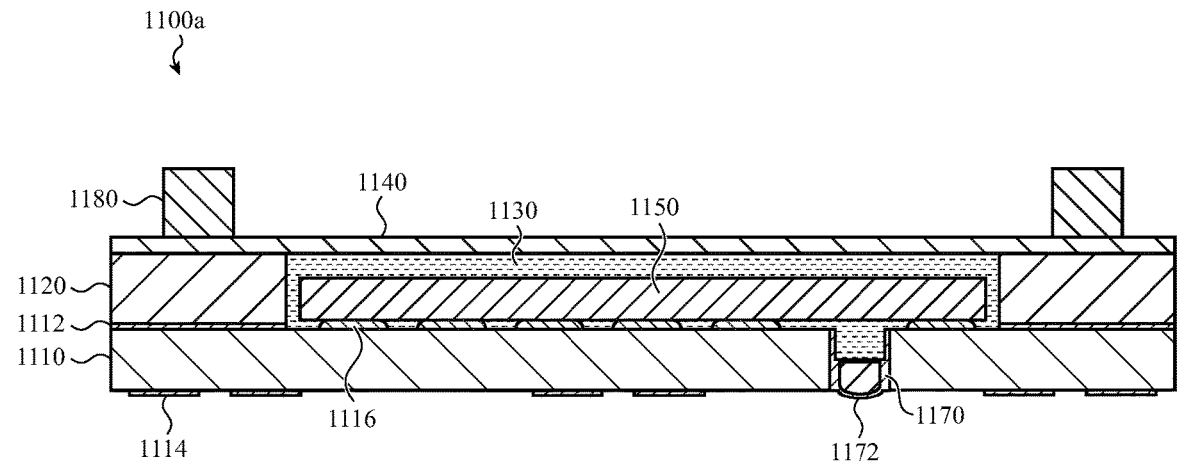
FIGS. 11A-11B illustrate cross-section views of an example oil-filled pressure-sensing device, in accordance with one or more embodiments.
Figure 11B:
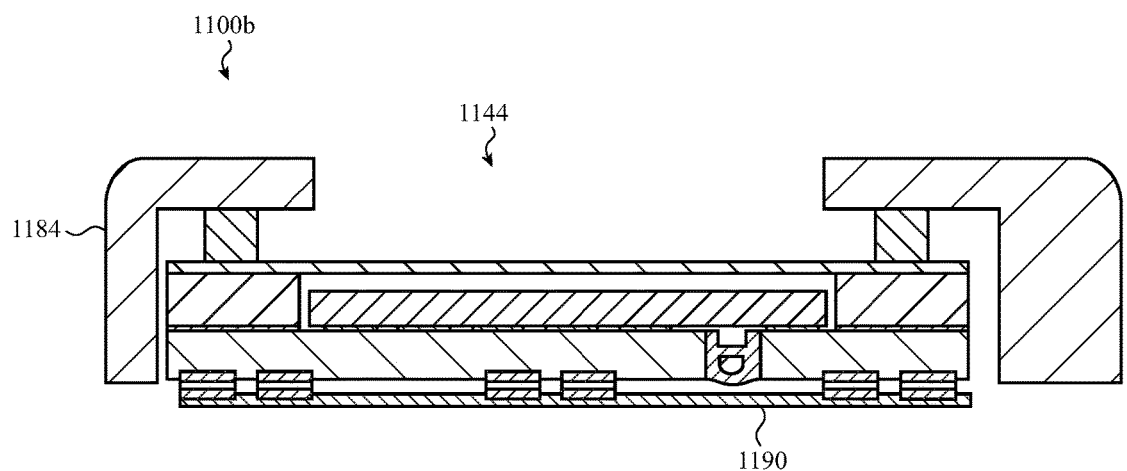

FIGS. 11A-11B are schematic diagrams illustrating cross-section views of example oil-filled pressure-sensing devices 1100A and 1100B, in accordance with one or more embodiments. The example oil-filled pressure-sensing device 1100A (hereinafter "device 1100A") is a low aspect ratio pressure sensor device as described herein. The device 1100A includes a substrate 1110 and a metal enclosure 1120 coupled to the substrate 1110 using an epoxy layer 1112. A pressure sensor 1150 is disposed on the substrate 1110 by employing a flip-chip technique using flip-chip solder pads 1116. The substrate may be made of any suitable material, such as ceramic, metal, a plastic, and so on.

The device 1100A further includes an isolation diaphragm 1140, which is coupled to the metal enclosure 1120 by soldering, brazing, welding, a pressure-sensitive adhesive or tape, an epoxy, an acrylic, a silicone adhesive, and so on. The substrate 1110 includes a plated-through hole 1170 that allows filling the oil 1130 and sealing the plated through hole 1170 with a plated oil-fill plug 1172. The substrate 1110 further includes solder pads 1114, which allow soldering the substrate 1110 to a circuit board such as flex including, for example, an ASIC for processing the pressure signal from the pressure sensor 1150. The pressure sensor 1150 can be a monolithic pressure sensor such as a MEMS pressure sensor. In one or more embodiments, the pressure sensor 1150 may be integrated with at least some electronic circuit. The device 1100A further includes elastomer face seals 1180, which can assist in securing the device 1100A to host system. The oil filling of the device 1100A and soldering of the plated oil-fill plug 1172 to the plated-through hole 1170 is performed using the inside-oil-soldering technique described above.

In some embodiments the low aspect ratio of the device 1100A is achieved by having an overall device thickness of less than 1 mm and an overall device width of more than 3 mm. The small dimensions make the device 1100A suitable for integration in a communication device such as a smart phone or a smart watch.

The elastomer face seals 1180 of the device 1100A are compressed by a system boundary 1184 of a port opening 1144 (see FIG. 11B) of a host system to securely mount the device 1100A. A circuit board (such as a printed circuit board or a flex circuit) 1190 is coupled to the substrate 1110 of the device 1100A via the solder pads 1114 of the substrate 1110. The circuit board 1190 may include an ASIC for processing the pressure signal from the pressure sensor 1150.

Figure 12:
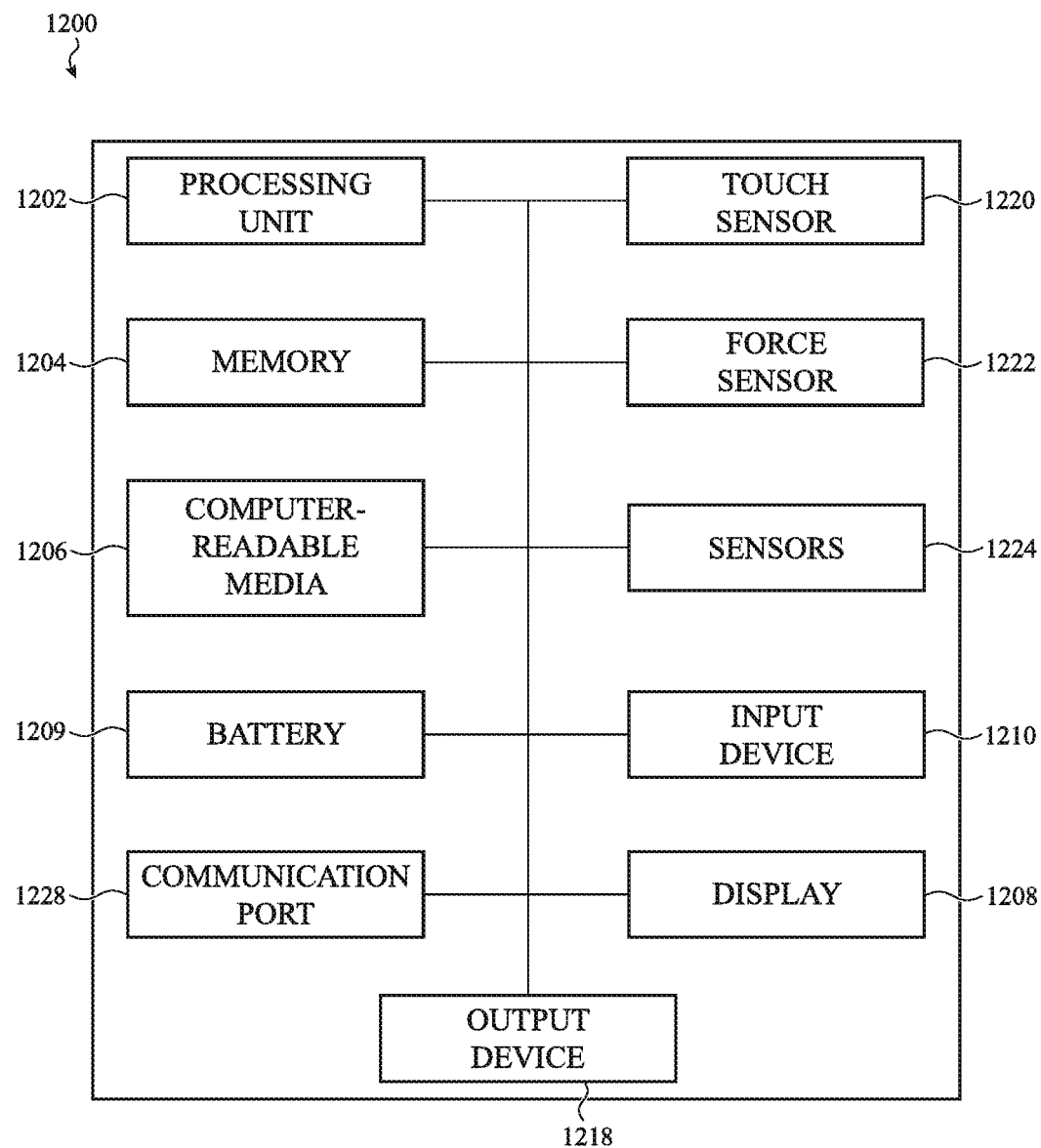
FIG. 12 is a block diagram illustrating an example wireless communication device, within which one or more oil-filled pressure-sensing devices can be integrated.

FIG. 12 depicts an example schematic diagram of an electronic device 1200. By way of example, the device 1200 of FIG. 12 may correspond to the wearable electronic device 100 shown in FIGS. 1A-1B (or any other wearable electronic device described herein). To the extent that multiple functionalities, operations, and structures are disclosed as being part of, incorporated into, or performed by the device 1200, it should be understood that various embodiments may omit any or all such described functionalities, operations, and structures. Thus, different embodiments of the device 1200 may have some, none, or all of the various capabilities, apparatuses, physical features, modes, and operating parameters discussed herein.

As shown in FIG. 12, a device 1200 includes a processing unit 1202 operatively connected to computer memory 1204 and/or computer-readable media 1206. The processing unit 1202 may be operatively connected to the memory 1204 and computer-readable media 1206 components via an electronic bus or bridge. The processing unit 1202 may include one or more computer processing units or microcontrollers that are configured to perform operations in response to computer-readable instructions. The processing unit 1202 may include the central processing unit (CPU) of the device. Additionally or alternatively, the processing unit 1202 may include other processing units within the device including application specific integrated chips (ASIC) and other microcontroller devices.

In some embodiments the processing unit 1202 may modify, change, or otherwise adjust operation of the electronic device in response to an output of a fluid-based pressure-sensing device, as described herein. For example, the processing unit may shut off the electronic device 1200 or suspend certain functions, like audio playback, if the pressure sensed by the pressure-sensing device exceeds a threshold. Likewise, the processing unit may activate the device or certain functions if the sensed pressure drops below a threshold (which may or may not be the same threshold previously mentioned). As yet another option, the processing unit 1202 may cause an alert to be displayed if pressure changes suddenly, as sensed by the pressure-sensing unit. This alert may indicate that a storm is imminent, a cabin or area has become depressurized, a port is blocked, and so on.

The memory 1204 may include a variety of types of non-transitory computer-readable storage media, including, for example, read access memory (RAM), read-only memory (ROM), erasable programmable memory (e.g., EPROM and EEPROM), or flash memory. The memory 1204 is configured to store computer-readable instructions, sensor values, and other persistent software elements. Computer-readable media 1206 also includes a variety of types of non-transitory computer-readable storage media including, for example, a hard-drive storage device, a solid-state storage device, a portable magnetic storage device, or other similar device.

The computer-readable media 1206 may also be configured to store computer-readable instructions, sensor values, and other persistent software elements.

In this example, the processing unit 1202 is operable to read computer-readable instructions stored on the memory 1204 and/or computer-readable media 1206. The computer-readable instructions may adapt the processing unit 1202 to perform the operations or functions described above with respect to FIGS. 1A-11B. In particular, the processing unit 1202, the memory 1204, and/or the computer-readable media 1206 may be configured to cooperate with a sensor 1224 (e.g., an image sensor that detects input gestures applied to an imaging surface of a crown) to control the operation of a device in response to an input applied to a crown of a device (e.g., the crown 112). The computer-readable instructions may be provided as a computer-program product, software application, or the like.

As shown in FIG. 12, the device 1200 also includes a display 1208. The display 1208 may include a liquid-crystal display (LCD), organic light emitting diode (OLED) display, light emitting diode (LED) display, or the like. If the display 1208 is an LCD, the display 1208 may also include a backlight component that can be controlled to provide variable levels of display brightness. If the display 1208 is an OLED or LED type display, the brightness of the display 1208 may be controlled by modifying the electrical signals that are provided to display elements. The display 1208 may correspond to any of the displays shown or described herein.

The device 1200 may also include a battery 1209 that is configured to provide electrical power to the components of the device 1200. The battery 1209 may include one or more power storage cells that are linked together to provide an internal supply of electrical power. The battery 1209 may be operatively coupled to power management circuitry that is configured to provide appropriate voltage and power levels for individual components or groups of components within the device 1200. The battery 1209, via power management circuitry, may be configured to receive power from an external source, such as an AC power outlet. The battery 1209 may store received power so that the device 1200 may operate without connection to an external power source for an extended period of time, which may range from several hours to several days.

In some embodiments, the device 1200 includes one or more input devices 1210. An input device 1210 is a device that is configured to receive user input. The one or more input devices 1210 may include, for example, a push button, a touch-activated button, a keyboard, a key pad, or the like (including any combination of these or other components). In some embodiments, the input device 1210 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 1220 and the force sensor 1222 are depicted as distinct components within the device 1200.

In some embodiments, the device 1200 includes one or more output devices 1218. An output device 1218 is a device that is configured to produce an output that is perceivable by a user. The one or more output devices 1218 may include, for example, a speaker, a light source (e.g., an indicator light), an audio transducer, a haptic actuator, or the like.

The device 1200 may also include one or more sensors 1224. In some cases, the sensors may include a fluid-based pressure-sensing device (such as an oil-filled pressure-sensing device) that determines conditions of an ambient environment external to the device 1200, a temperature sensor, a liquid sensor, or the like. The sensors 1224 may also include a sensor that detects inputs provided by a user to a crown of the device (e.g., the crown 112). As described above, the sensor 1224 may include sensing circuitry and other sensing elements that facilitate sensing of gesture inputs applied to an imaging surface of a crown, as well as other types of inputs applied to the crown (e.g., rotational inputs, translational or axial inputs, axial touches, or the like). The sensor 1224 may include an optical sensing element, such as a charge-coupled device (CCD), complementary metal—oxide—semiconductor (CMOS), or the like. The sensors 1224 may correspond to any sensors described herein or that may be used to provide the sensing functions described herein.

The device 1200 may also include a touch sensor 1220 that is configured to determine a location of a touch on a touch-sensitive surface of the device 1200 (e.g., an input surface defined by the portion of a cover 108 over a display 109). The touch sensor 1220 may use or include capacitive sensors, resistive sensors, surface acoustic wave sensors, piezoelectric sensors, strain gauges, or the like. In some cases the touch sensor 1220 associated with a touch-sensitive surface of the device 1200 may include a capacitive array of electrodes or nodes that operate in accordance with a mutual-capacitance or self-capacitance scheme. The touch sensor 1220 may be integrated with one or more layers of a display stack (e.g., the display 109) to provide the touch-sensing functionality of a touchscreen. Moreover, the touch sensor 1220, or a portion thereof, may be used to sense motion of a user's finger as it slides along a surface of a crown, as described herein.

The device 1200 may also include a force sensor 1222 that is configured to receive and/or detect force inputs applied to a user input surface of the device 1200 (e.g., the display 109). The force sensor 1222 may use or include capacitive sensors, resistive sensors, surface acoustic wave sensors, piezoelectric sensors, strain gauges, or the like. In some cases, the force sensor 1222 may include or be coupled to capacitive sensing elements that facilitate the detection of changes in relative positions of the components of the force sensor (e.g., deflections caused by a force input). The force sensor 1222 may be integrated with one or more layers of a display stack (e.g., the display 109) to provide force-sensing functionality of a touchscreen.

The device 1200 may also include a communication port 1228 that is configured to transmit and/or receive signals or electrical communication from an external or separate device. The communication port 1228 may be configured to couple to an external device via a cable, adaptor, or other type of electrical connector. In some embodiments, the communication port 1228 may be used to couple the device 1200 to an accessory, including a dock or case, a stylus or other input device, smart cover, smart stand, keyboard, or other device configured to send and/or receive electrical signals.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch, comprising:
   a housing defining a volume and a channel coupling the volume to an external environment;
   a display at least partially within the volume;
   a cover adjacent the display and coupled to the housing; and
   a pressure-sensing device within the volume, configured to measure a pressure of the volume, and comprising:
   an enclosure;
   an isolation diaphragm hermetically sealed to the enclosure;
   a sensing medium within the enclosure; and
   a pressure sensor encapsulated by the sensing medium; wherein
   the channel is configured to equalize the pressure of the volume and a pressure of the external environment; and
   the display is configured to display the pressure of the volume.

2. The electronic watch of claim 1, wherein:
   the sensing medium is a silicone oil;
   the electronic watch further comprises a substrate coupled to the enclosure;
   the enclosure, isolation diaphragm, and substrate cooperate to retain the silicone oil within the enclosure; and
   the isolation diaphragm is configured to deform in response to a change in pressure, thereby moving the silicone oil.

3. The electronic watch of claim 1, further comprising:
   a crown configured to rotate and translate; wherein:
   the pressure-sensing device is configured to measure the pressure of the volume in response to the crown rotating or translating; and
   the display is configured to display the pressure of the volume in response to the crown rotating or translating.

4. The electronic watch of claim 1, wherein the enclosure is coupled to the housing.

5. The electronic watch of claim 1, further comprising a filter disposed in the channel and configured to reduce ingress of contaminants from the external environment to the volume.

6. The electronic watch of claim 1, wherein the channel is an audio port configured to transmit sound through the housing.

7. The electronic watch of claim 1, further comprising a processing unit configured to modify an operation of the electronic watch based on the pressure of the volume.

8. An electronic watch, comprising:
   a housing defining a volume and a channel coupling the volume to an external environment;
   a display at least partially within the volume and configured to display information;
   a substrate coupled to the housing;
   an oil-filled pressure-sensing device positioned within the volume and physically and electrically coupled to the substrate, the oil-filled pressure-sensing device comprising:
   an enclosure;
   a pressure sensor positioned within the enclosure; and
   a diaphragm sealed to the enclosure, the diaphragm and oil configured to transmit a pressure within the volume to the pressure sensor;
   a band coupled to the housing and configured to couple the housing to a wearer; and
   a processing unit electrically coupled to the oil-filled pressure-sensing device and the display; wherein:
   the processing unit is configured to control the display;
   the processing unit is configured to receive an output from the oil-filled pressure-sensing device; and
   the information displayed by the display changes based on the output.

9. The electronic watch of claim 8, wherein the processing unit is further configured to change a function of the electronic watch based on the output.

10. The electronic watch of claim 8, wherein:
    the oil-filled pressure-sensing device is substantially filled with an incompressible silicone oil.

11. The electronic watch of claim 10, wherein the diaphragm comprises polyimide, TEFLON, polyethylene, polypropylene, ePTFE, or a corrugated polymer.

12. The electronic watch of claim 11, wherein the diaphragm further comprises:
    a first metal layer coupled to a first side of the polyimide; and
    a second metal layer coupled to a second side of the polyimide.

13. The electronic watch of claim 11, wherein:
    the enclosure is a metal enclosure; and
    the diaphragm is coupled to the metal enclosure by soldering, brazing, welding, pressure-sensitive adhesive, a pressure-sensitive tape, an epoxy, an acrylic, or a silicone adhesive.

14. The electronic watch of claim 10, wherein the diaphragm is hydrophobic or oleophobic.

15. The electronic watch of claim 8, wherein:
    the oil-filled pressure-sensing device has a height and a width; and
    a ratio of the height to the width is no more than 1 to 3.

16. The electronic watch of claim 8, further comprising a crown configured to move relative to the housing; wherein:
    the oil-filled pressure-sensing device generates the output in response to a motion of the crown.

17. An electronic watch, comprising:
    a housing;
    a band coupled to the housing and configured to couple the housing to a wearer;
    a pressure-sensing device, comprising:
    an enclosure coupled to the housing;
    a diaphragm coupled to the enclosure;
    a pressure sensor within the enclosure; and a sensing medium within the enclosure and configured to encapsulate the pressure sensor;
a battery coupled to the pressure-sensing device; and
a processing unit coupled to the pressure-sensing device; wherein:
the pressure-sensing device is configured to measure a pressure of an external environment;
the battery is configured to supply power to the pressure-sensing device and the processing unit; and
the processing unit is configured to adjust an operation of the electronic watch based on the pressure of the external environment.

18. The electronic watch of claim 17, wherein:
the enclosure comprises at least one of metal or ceramic;
the diaphragm comprises polyimide; and
the sensing medium comprises a silicone fluid.

19. The electronic watch of claim 18, wherein the diaphragm further comprises metal coupled to the polyimide.

20. The electronic watch of claim 17, further comprising a display configured to display the pressure of the external environment.

* * * * *